(12) United States Patent
Piroozmandi

(10) Patent No.: US 9,522,741 B2
(45) Date of Patent: Dec. 20, 2016

(54) AIRCRAFT TIPPING ALARM SYSTEM AND METHOD USING FLUID PRESSURE MEASUREMENT ON NOSE LANDING GEAR SHOCK STRUT

(71) Applicant: The Boeing Company, Chicago, IL (US)

(72) Inventor: Farid Piroozmandi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 101 days.

(21) Appl. No.: 14/625,564

(22) Filed: Feb. 18, 2015

(65) Prior Publication Data

US 2016/0236796 A1    Aug. 18, 2016

(51) Int. Cl.
    *B64C 25/60*    (2006.01)
    *B64D 45/00*    (2006.01)
    *B64C 25/34*    (2006.01)

(52) U.S. Cl.
    CPC ............. *B64D 45/00* (2013.01); *B64C 25/34* (2013.01); *B64C 25/60* (2013.01); *B64D 2700/62043* (2013.01)

(58) Field of Classification Search
    CPC ..................................................... B64D 45/00
    USPC ......................................... 340/945; 244/137.1
    See application file for complete search history.

(56) References Cited

U.S. PATENT DOCUMENTS 3,584,503 A *   6/1971   Senour .................. G01M 1/125
                                                             340/666
3,701,279 A    10/1972   Harris et al.
4,034,334 A     7/1977   Allyn
4,312,042 A     1/1982   Bateman
4,507,742 A     3/1985   Bateman
6,128,951 A    10/2000   Nance
6,499,005 B2   12/2002   Gunderson et al.
6,854,689 B1    2/2005   Lindahl et al.
7,093,795 B2    8/2006   Lindahl et al.
7,274,310 B1 *  9/2007   Nance .................... G08B 21/00
                                                             244/100 R (Continued)

FOREIGN PATENT DOCUMENTS

CN    101349606 A    1/2009
DE     20206677 U1   7/2002

OTHER PUBLICATIONS

Extended European Search Report issued Jul. 18, 2016, for related corresponding EP application EP16154791.4-1754, Applicant The Boeing Company, 9 pages.

*Primary Examiner* — Qutbuddin Ghulamali

(57) ABSTRACT

There is provided an aircraft tipping alarm system having a nose landing gear (NLG) shock strut containing hydraulic fluid and having an aperture. The system further has an elongated pressure chamber assembly configured to engage to the aperture. The elongated pressure chamber assembly has an elongated pressure chamber containing hydraulic fluid and having a pressure sensor device, a first check valve configured to restrict hydraulic fluid flow only into the NLG shock strut, a second check valve configured to restrict hydraulic fluid flow only into the elongated pressure chamber, and a reduced diameter breakable neck section. A potential aircraft tipping back position is indicated when a reduction of pressure of the hydraulic fluid in the NLG shock strut, sensed via the pressure sensor device, is greater than or equal to a pressure reduction threshold.

23 Claims, 11 Drawing Sheets

(56) References Cited

U.S. PATENT DOCUMENTS

| | | |
|---|---|---|
| 7,475,849 B2 | 1/2009 | Lindahl et al. |
| 7,944,372 B2 | 5/2011 | Gouette et al. |
| 2008/0119967 A1* | 5/2008 | Long .................... G01G 19/07 701/3 |
| 2009/0105874 A1* | 4/2009 | Tietjen .................... B64D 9/00 700/217 |

* cited by examiner

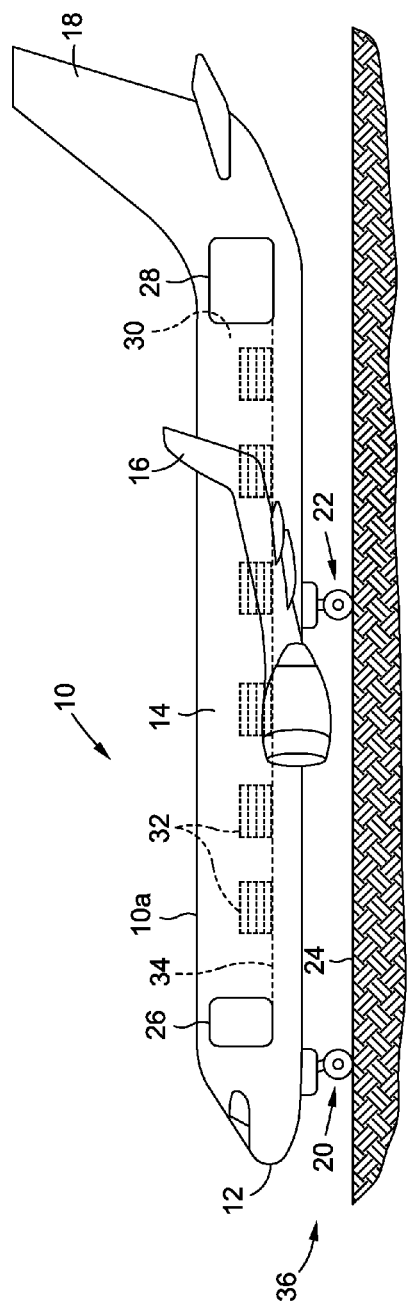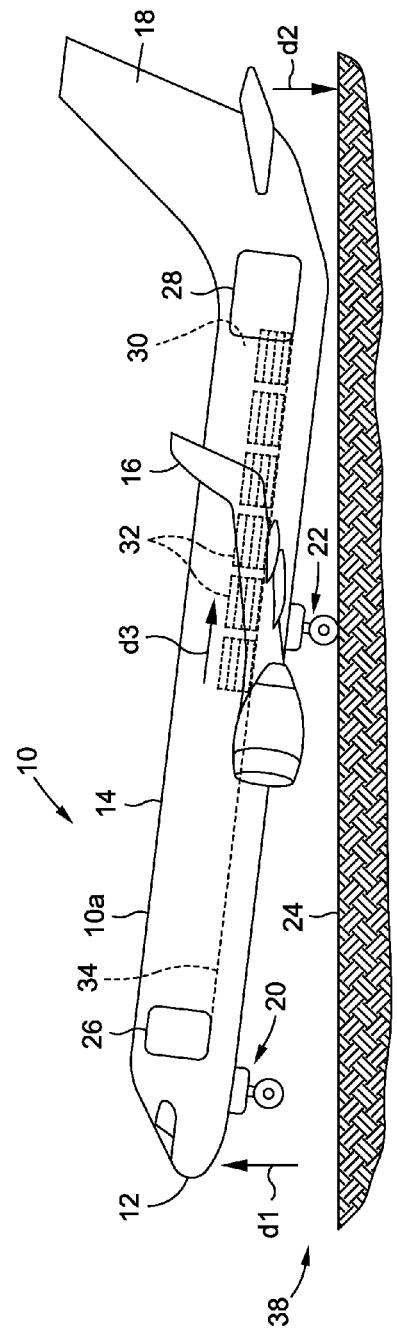

AIRCRAFT TIPPING ALARM SYSTEM AND METHOD USING FLUID PRESSURE MEASUREMENT ON NOSE LANDING GEAR SHOCK STRUT

BACKGROUND

1) Field of the Disclosure

The disclosure relates generally to pressure sensor systems and methods for aircraft, and more particularly, to an aircraft tipping alarm system and method using fluid pressure measurement on a nose landing gear (NLG) shock strut of the aircraft to signal, when the aircraft has been loaded or unloaded in such a way that it is in danger of tipping back on its tail unless preventative action is taken.

2) Description of Related Art

Key factors in the flight of an aircraft are the weight and balance of the aircraft. The weight of an aircraft is typically supported by retractable landing gear struts. Such landing gear struts contain pressurized hydraulic fluid and nitrogen gas. The pressure within each landing gear strut is related to the amount of weight that landing gear strut is supporting. Large aircraft, such as cargo or freighter aircraft and commercial passenger aircraft, may be supported by a nose landing gear (NLG) shock strut disposed at the front of the aircraft and two or more main landing gear (MLG) struts disposed aft of the aircraft's center of gravity and bilaterally symmetrical to its roll axis. Whether the aircraft is in proper balance or within acceptable limits is also important. An aircraft's pre-flight weight and balance determination is typically made while the aircraft is parked on the ground.

A primary consideration related to an aircraft's weight and balance, particularly for large aircraft that may carry heavy cargo and/or passenger loads, is that the aircraft not be loaded or unloaded in such a way that the change in loading causes the aircraft to tip backward on its tail. If the aircraft tips backward on its tail and comes into contact with the ground, the aircraft may be damaged to an extent that the aircraft cannot be flown without great expense to repair or replace the aircraft, if such repair or replacement is even possible.

Known systems and methods exist for aircraft tip-back alarms. One such known tip-back alarm system uses a sensor having a sensing part and a target part mounted on the nose landing gear (NLG), and detects an extension of the nose landing gear (NLG) beyond a preset tipping threshold, during cargo loading and unloading operations, and sends an alarm signal to ground personnel responsible for the loading of the aircraft. However, such known tip-back alarm system requires the use and installation of an additional structural and mechanical moving system to the aircraft. This may increase the aircraft manufacturing and labor costs and may increase the time and complexity of manufacturing the aircraft.

In addition, another known system and method exists for preventing aircraft tip backs that involves using a harness system that wraps a mechanical harness around the nose landing gear (NLG) of the aircraft to hold the nose landing gear (NLG) down even if the aircraft tips back. However, such known harness system may require an experienced operator to operate the harness system to avoid mishandling of the harness system. Moreover, such known harness system may not be installed or available at places where the aircraft is loading or unloading, such as in an area of conflict where there may not be a cargo airport.

Accordingly, there is a need in the art for an aircraft tipping alarm system and method that is simple to install, use and service, safe, reliable and repeatable, and that provide advantages over known systems and methods.

SUMMARY

Example implementations of this disclosure provide an aircraft tipping alarm system and method using fluid pressure measurement on a nose landing gear (NLG) shock strut of the aircraft. As discussed in the below detailed description, embodiments of the aircraft tipping alarm system and method may provide significant advantages over existing aircraft tipping alarm systems and methods.

In one embodiment there is provided an aircraft tipping alarm system for an aircraft. The aircraft tipping alarm system comprises a nose landing gear (NLG) shock strut containing hydraulic fluid and having an aperture. The aircraft tipping alarm system further comprises an elongated pressure chamber assembly configured to engage to the aperture.

The elongated pressure chamber assembly comprises an elongated pressure chamber containing hydraulic fluid and having a pressure sensor device. The elongated pressure chamber assembly further comprises a first check valve configured to restrict hydraulic fluid flow only into the NLG shock strut. The elongated pressure chamber assembly further comprises a second check valve configured to restrict hydraulic fluid flow only into the elongated pressure chamber. The elongated pressure chamber assembly further comprises a reduced diameter breakable neck section.

A potential aircraft tipping back position is indicated when a reduction of pressure of the hydraulic fluid in the NLG shock strut, sensed via the pressure sensor device, is greater than or equal to a pressure reduction threshold.

In another embodiment there is provided a cargo aircraft. The cargo aircraft comprises a nose landing gear (NLG) assembly coupled to a fuselage. The cargo aircraft may further comprise at least one wing coupled to the fuselage and at least two main landing gear assemblies coupled to the fuselage.

The cargo aircraft further comprises an aircraft tipping alarm system coupled to the NLG assembly. The aircraft tipping alarm system comprises a nose landing gear (NLG) shock strut containing oleo fluid and having an aperture. The aircraft tipping alarm system further comprises an elongated pressure chamber assembly configured to engage to the aperture.

The elongated pressure chamber assembly comprises an elongated pressure chamber containing oleo fluid and having a pressure sensor device. The elongated pressure chamber assembly further comprises a first check valve configured to restrict oleo fluid flow only into the NLG shock strut.

The elongated pressure chamber assembly further comprises a second check valve configured to restrict oleo fluid flow only into the elongated pressure chamber. The second check valve has an externally threaded open end portion configured for coupling to a fluid pump and supply assembly. The elongated pressure chamber assembly further comprises a reduced diameter breakable neck section configured to break away from the NLG shock strut in an impact event, and wherein upon breakage of the reduced diameter breakable neck section, only the first check valve remains engaged to the aperture.

A potential aircraft tipping back position is indicated when a reduction of pressure of the oleo fluid in the NLG shock strut, sensed via the pressure sensor device, is greater than or equal to fifty percent (50%) of a predetermined pressure level of the oleo fluid in the nose landing gear shock strut.

In another embodiment there is provided a method for preventing or alarming against the tipping back position of an aircraft during a loading or unloading of the aircraft on ground. The method comprises the step of equipping the aircraft with an aircraft tipping alarm system. The aircraft tipping alarm system comprises an elongated pressure chamber assembly coupled to a nose landing gear (NLG) shock strut via a first check valve. The elongated pressure chamber assembly comprises a pressure sensor device and a reduced diameter breakable neck section.

The method further comprises the step of determining a predetermined pressure level of a hydraulic fluid in the NLG shock strut. The method further comprises the step of activating the aircraft tipping alarm system during the loading or unloading of the aircraft.

The method further comprises the step of measuring a reduction of pressure of the hydraulic fluid in the NLG shock strut via the pressure sensor device coupled to an elongated pressure chamber, which is coupled to the NLG shock strut, during the loading or unloading of the aircraft. The method further comprises the step of generating and transmitting with the pressure sensor device an aircraft tipping alarm signal, when the reduction of pressure of the hydraulic fluid in the NLG shock strut, sensed via the pressure sensor device, is greater than or equal to fifty percent (50%) of the predetermined pressure level, indicating a potential aircraft tipping back position.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 1A is a left side elevation view of an aircraft shown disposed on the ground shown in a non-tipping position;

FIG. 1B is a left side elevation view of the aircraft of FIG. 1A shown in a tipping back position;

Each figure shown in this disclosure shows a variation of an aspect of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 4:
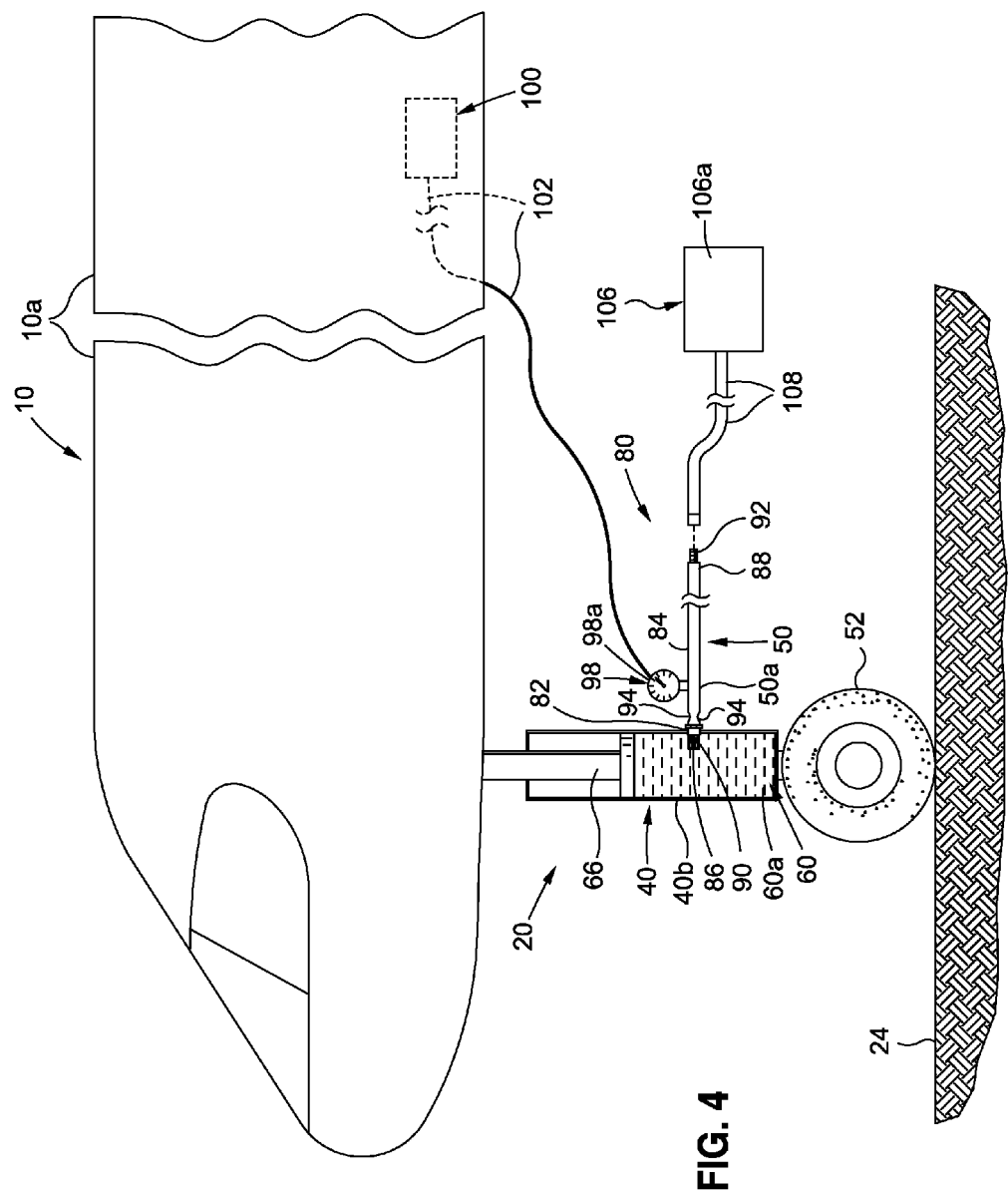
FIG. 4 is a partial cross-sectional view of an embodiment of an aircraft tipping alarm system of the disclosure coupled to a nose landing gear (NLG) assembly of an aircraft.

Now referring to the Figures, FIG. 1A is a left side elevation view of an aircraft 10, such as in the form of a cargo aircraft 10a or freighter aircraft, that may be used with or that may incorporate one or more embodiments of an aircraft tipping alarm system 80 (see FIGS. 4-7) or a method 180 (see FIG. 8) of the disclosure for preventing the tipping back of the aircraft 10 (see FIG. 4) during the loading or unloading of the aircraft 10 (see FIG. 4) on the ground 24 (see FIG. 4). As used herein, "cargo aircraft" or "freighter aircraft" means an aircraft that is designed or converted for the carriage of cargo or goods, rather than passengers. The aircraft tipping alarm system 80 (see FIGS. 4-7) and method 180 (see FIG. 8) use fluid pressure measurement on a nose landing gear (NLG) shock strut 40 (see FIG. 4) of the aircraft 10 (see FIG. 4) to signal when the aircraft 10 (see FIG. 4) has been loaded or unloaded in such a way that it is in danger of tipping back on its tail 18 (see FIG. 1A) unless preventative action is taken.

As shown in FIG. 1A, the aircraft 10, such as in the form of cargo aircraft 10a, preferably comprises a nose 12, a fuselage 14, at least one wing 16, a tail 18, a nose landing gear (NLG) assembly 20, and two main landing gear (MLG) assemblies 22. As further shown in FIG. 1A, the aircraft 10, such as in the form of a cargo aircraft 10a, is disposed on the ground 24.

As further shown in FIG. 1A, the aircraft 10, such as in the form of a cargo aircraft 10a, may comprise a forward door 26, an aft door 28, and a cargo bay 30 for loading and unloading cargo 32 loaded onto or unloaded off of a cargo deck 34 in the aircraft 10. The aircraft 10 in FIG. 1A is shown in a non-tipping position 36.

FIG. 1B is a left side elevation view of the aircraft 10, such as in the form of cargo aircraft 10a, of FIG. 1A shown in a tipping back position 38. As shown in FIG. 1B, in the tipping back position 38, the nose 12 and the nose landing gear (NLG) assembly 20 of the aircraft 10 is tipped in an upward direction (d1) and the tail 18 is tipped in a downward direction (d2). As further shown in FIG. 1B, in the tipping back position 38, the cargo 32 loaded on the cargo deck 34 in the cargo bay 30 has moved backward in an aft direction (d3) toward the tail 18.

Although the aircraft 10, such as in the form of cargo aircraft 10a, shown in FIG. 1A is generally representative of a cargo aircraft 10a or freighter aircraft that may be used with one or more embodiments of the aircraft tipping alarm system 80 (see FIG. 4), the teachings of the disclosed embodiments may be applied to commercial aircraft, military aircraft, rotorcraft, and other types of aircraft or aerial vehicles having a nose landing gear assembly 20 (see FIG. 1A).

Figure 2:
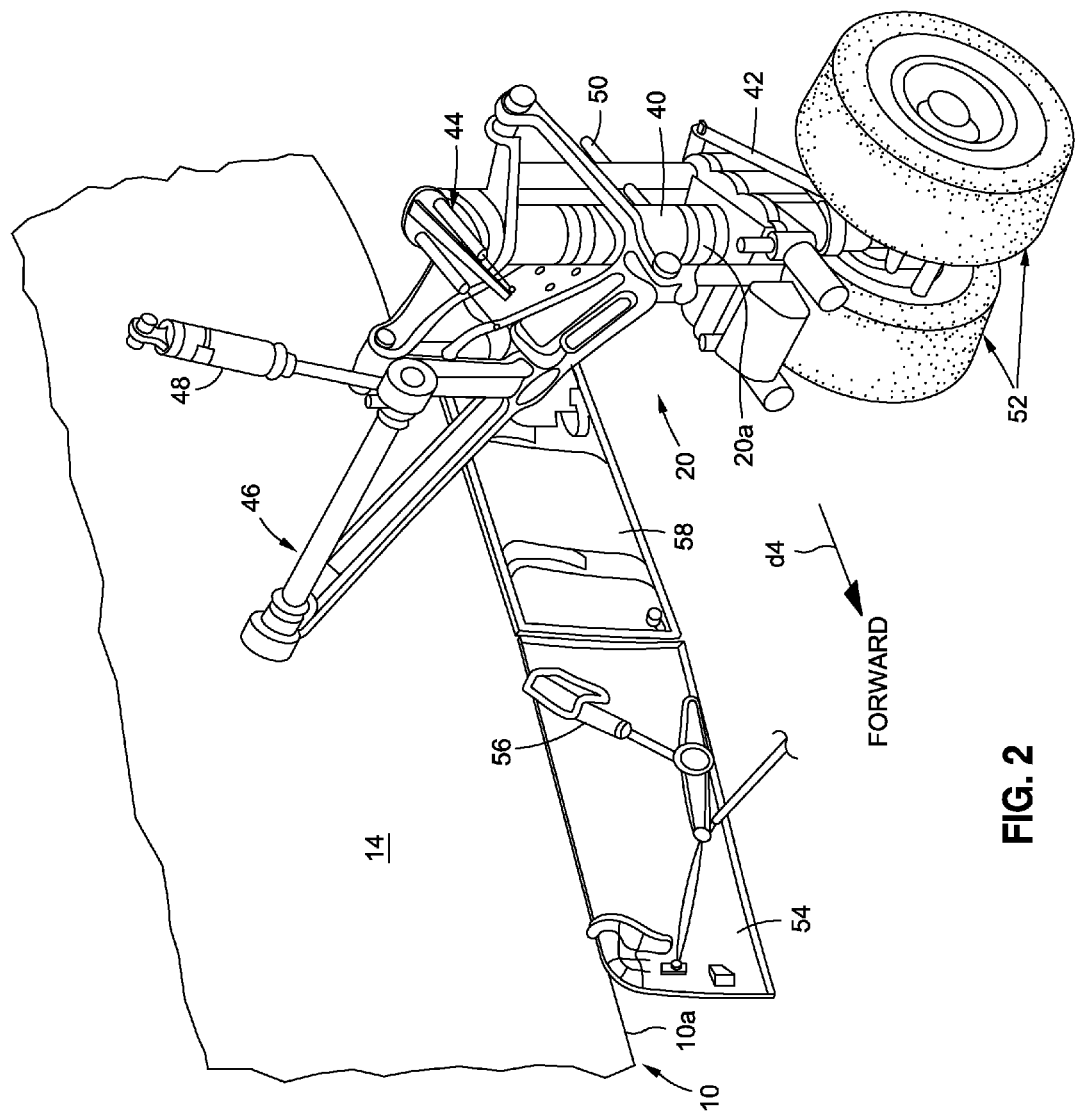
FIG. 2 is a front perspective view of an exemplary nose landing gear (NLG) assembly having a nose landing gear (NLG) shock strut that may be used in an embodiment of the aircraft tipping alarm system of the disclosure.

Referring to FIG. 2, FIG. 2 is a front perspective view of an exemplary nose landing gear (NLG) assembly 20, such as in the form of NLG assembly 20a, having a nose landing gear (NLG) shock strut 40 that may be used in an embodiment of the aircraft tipping alarm system 80 (see FIGS. 4-7) of the disclosure. As shown in FIG. 2, the NLG assembly 20 is extended downwardly from the fuselage 14 of the aircraft 10, such as in the form of cargo aircraft 10a, and is shown facing in a forward direction (d4).

As further shown in FIG. 2, the NLG assembly 20 may comprise the NLG shock strut 40 coupled between a nose landing gear (NLG) torsion link assembly 42, a nose landing gear (NLG) lock link assembly 44, and a nose landing gear drag strut assembly 46. A retract actuator 48 (see FIG. 2) for actuating the NLG assembly 20 (see FIG. 2) connects the NLG assembly 20 (see FIG. 2) to the aircraft 10 (see FIG. 2).

As further shown in FIG. 2, the elongated pressure chamber assembly 50 is coupled to the NLG shock strut 40 of the NLG assembly 20. A tire assembly 52 (see FIG. 2) is preferably coupled to the NLG shock strut 40 (see FIG. 2) of the NLG assembly 20 (see FIG. 2). The NLG assembly 20 (see FIG. 2) is preferably extended from the aircraft 20 (see FIG. 2) through a right forward nose landing gear (NLG) door 54 (see FIG. 2) via a forward nose landing gear door (NLG) actuator 56 (see FIG. 2), and through an opposite left forward nose landing gear (NLG) door (not shown). The NLG assembly 20 (see FIG. 2) is also preferably extended from the aircraft 20 (see FIG. 2) through a right aft nose landing gear (NLG) door 58 and through an opposite left aft nose landing gear door (not shown).

Figure 3:
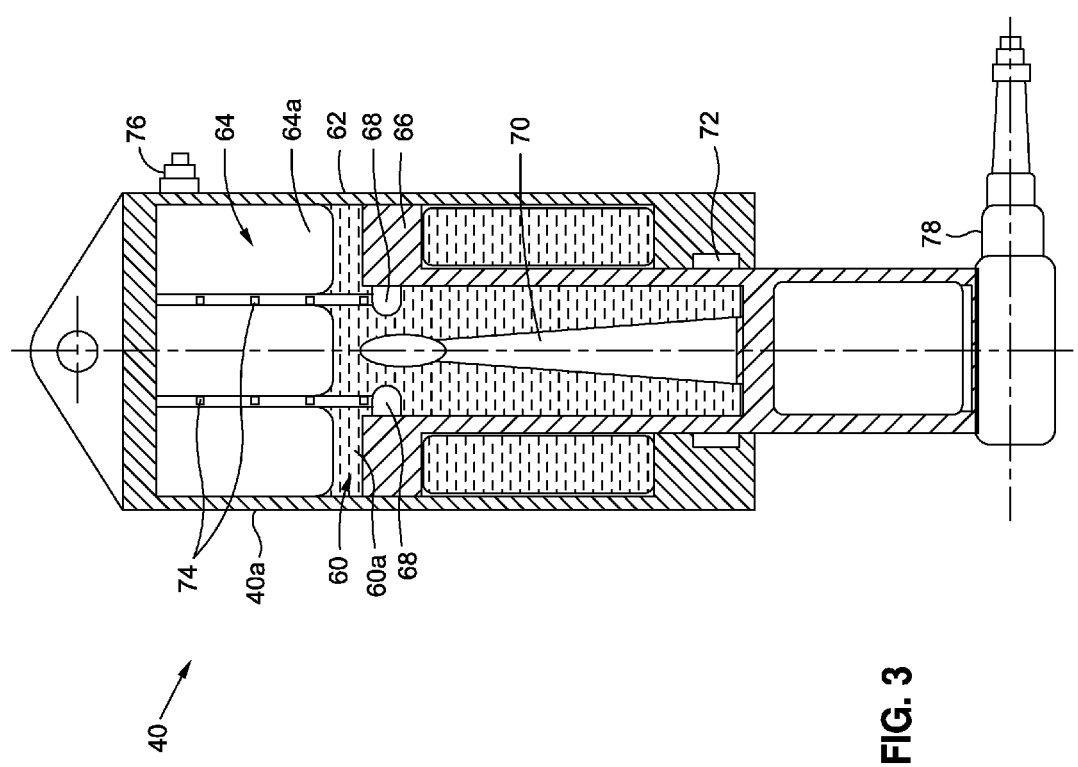
FIG. 3 is a cross-sectional front view of an exemplary nose landing gear (NLG) shock strut that may be used in an embodiment of an aircraft tipping alarm system of the disclosure.

Referring to FIG. 3, FIG. 3 is a cross-sectional front view of an exemplary nose landing gear (NLG) shock strut 40, such as in the form of a nose landing gear (NLG) oleo pneumatic shock strut 40a, that may be used in an embodiment of the aircraft tipping alarm system 80 (see FIG. 4) of the disclosure. The NLG shock strut 40 shown in FIG. 3 comprises a housing 62 containing a hydraulic fluid 60, such as in the form of an oleo fluid 60a, and a containing a gas 64, such as in the form of a dry nitrogen gas 64a. As used herein, "oleo fluid" means oil.

As further shown in FIG. 3, the NLG shock strut 40 comprises a piston 66, one or more orifices 68, a metering pin 70, sealing rings 72, support tubes 74, and a pressure valve 76. The NLG shock strut 40 (see FIG. 3) is preferably coupled to a tire axle 78 (see FIG. 3) for the tire assembly 52 (see FIG. 2). The metering pin 70 (see FIG. 3) varies the effective size of the one or more orifices 68 (see FIG. 3) and therefore the rate of hydraulic fluid flow 142 (see FIG. 7) within the NLG shock strut 40 (see FIG. 3). The more the NLG shock strut 40 (see FIG. 3) compresses, the tighter the one or more orifices 68 (see FIG. 3) become, and the more resistant the NLG shock strut 40 (see FIG. 3) is to compress or extend.

The (NLG) shock strut 40 (see FIG. 3), such as in the form of NLG oleo pneumatic shock strut 40a (see FIG. 3), uses the dry nitrogen gas 64a (see FIG. 3) or compressed air, combined with the hydraulic fluid 60 (see FIG. 3), such as in the form of oleo fluid 60a (see FIG. 3), to absorb and dissipate the shock of landing of the aircraft 10 (see FIG. 1A), and to damp the recoil to minimize bounced landings.

Referring to FIG. 4, FIG. 4 is a partial cross-sectional view of an embodiment of an aircraft tipping alarm system 80 of the disclosure coupled to a nose landing gear (NLG) assembly 20. As shown in FIG. 4, in one embodiment, there is provided the aircraft tipping alarm system 80 for the aircraft 10. The aircraft 10 (see FIG. 4) is preferably a cargo aircraft 10a (see FIG. 4).

As shown in FIG. 4, the aircraft tipping alarm system 80 comprises the nose landing gear (NLG) shock strut 40, such as in the form of nose landing gear (NLG) shock strut 40b. The NLG shock strut 40, such as in the form of NLG shock strut 40b, comprises a piston 66, contains hydraulic fluid 60, such as in the form of oleo fluid 60a, and has an aperture 82.

As shown in FIG. 4, the aircraft tipping alarm system 80 further comprises the elongated pressure chamber assembly 50, such as in the form of elongated pressure chamber assembly 50a, configured to engage to the aperture 82. The elongated pressure chamber assembly 50 (see FIG. 4), such as in the form of elongated pressure chamber assembly 50a (see FIG. 4), comprises an elongated pressure chamber 84 (see FIG. 4). The elongated pressure chamber 84 (see FIG. 4) preferably has a pressure sensor device 98 (see FIG. 4) that directly senses a pressure 154 (see FIG. 7) in the elongated pressure chamber 84 and indirectly senses a pressure 152 (see FIG. 7) in the NLG shock strut 40 (see FIG. 4). The pressure sensor device 98 (see FIG. 4) may be coupled to the exterior of the elongated pressure chamber 84 (see FIGS. 4, 5A), or may be coupled within the elongated pressure chamber 84 (see FIG. 5B). The elongated pressure chamber 84 (see FIG. 4) is preferably of a sufficient length and size to enable the pressure sensor device 98 (see FIG. 4) to be coupled to or within the elongated pressure chamber 84 (see FIG. 4). The elongated pressure chamber 84 (see FIG. 4) is preferably coupled between the pressure sensor device 98 (see FIG. 4) and the NLG shock strut 40 (see FIG. 4).

The pressure sensor device 98 (see FIG. 4) is preferably a fluid pressure sensor device or pressure transducer, that may be in the form of a mechanical gauge pressure sensor 98a (see FIG. 4) positioned on the exterior or outside the elongated pressure chamber 84 (see FIG. 4), may be in the form of a piezoelectric pressure sensor 98b (see FIG. 5B) positioned in the interior or inside the elongated pressure chamber 84 (see FIG. 5B), or may be in the form of another suitable gauge pressure sensor, a vacuum pressure sensor, a differential pressure sensor, a sealed pressure sensor, or another suitable pressure sensor device 98.

The pressure sensor device 98 (see FIG. 4) acts as a transducer, in that it generates and transmits an aircraft tipping alarm signal 156 (see FIG. 7), as a function of a predetermined pressure threshold or pressure level reached. Preferably, the aircraft tipping alarm signal 156 (see FIG. 7) is an electrical signal. The pressure sensor device 98 may be coupled to a wired connection 102 (see FIG. 4) or a wireless connection (not shown), that, in turn, is coupled to an alarm control system 100 (see FIG. 4). The wired connection 102 (see FIG. 4) acts as the pressure sensor signal wire to transmit the aircraft tipping alarm signal 156 (see FIG. 7) to the alarm control system 100 (see FIG. 4) to activate or trigger an aircraft tipping alarm 158 (see FIG. 7).

Figure 7:
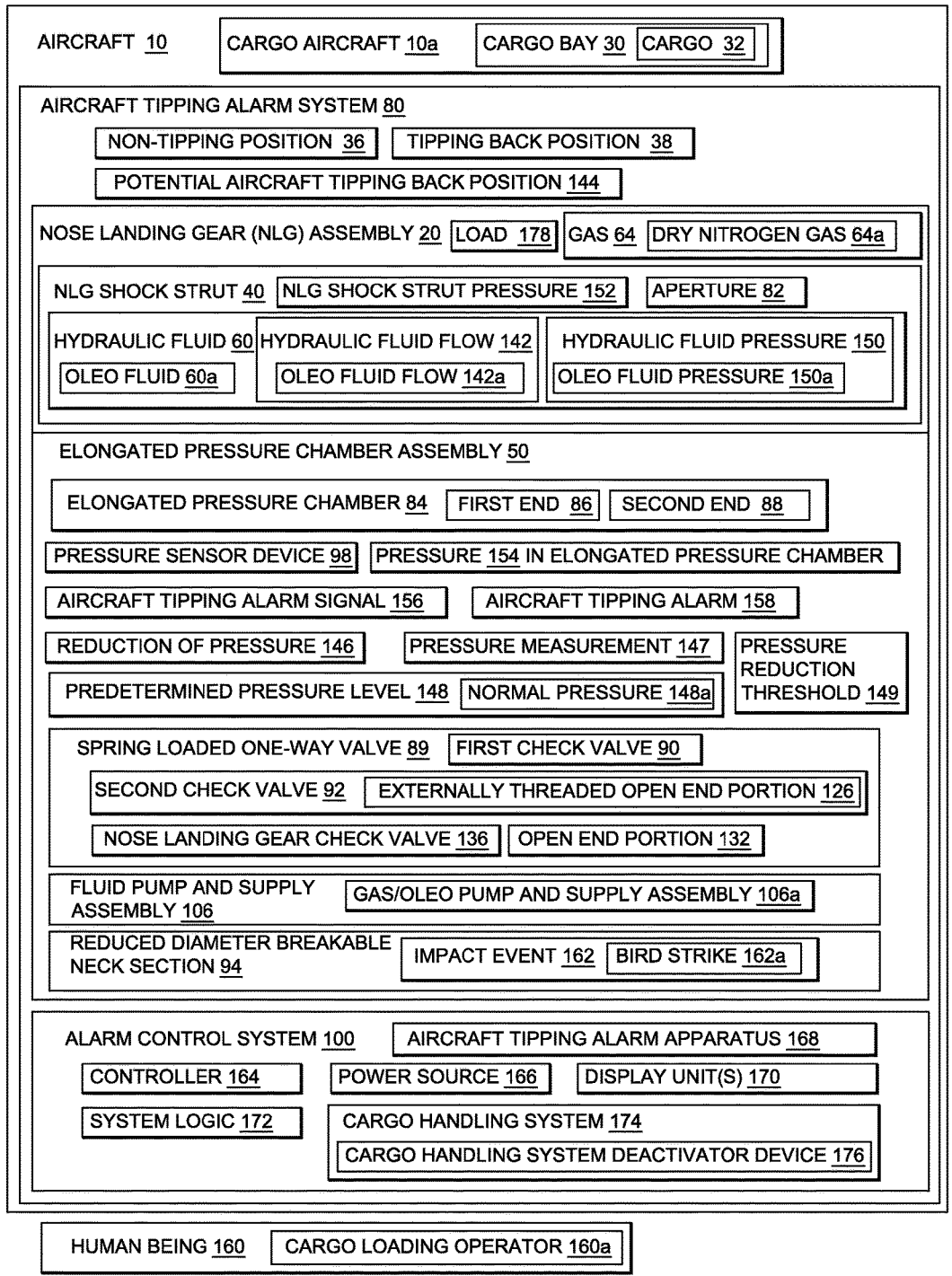
FIG. 7 is an illustration of a functional block diagram showing an exemplary embodiment of an aircraft with an aircraft tipping alarm system of the disclosure.

When a potential aircraft tipping back position 144 (see FIG. 7) is indicated, the pressure sensor device 98 (see FIGS. 4, 7) generates and transmits the aircraft tipping alarm signal 156 (see FIG. 7) via the wired connection 102 (see FIG. 4) or a wireless connection (not shown) to produce the aircraft tipping alarm 158 (see FIG. 7) that is sensible to a human being 160 (see FIG. 7).

The aircraft tipping alarm signal 156 (see FIG. 7) triggers the aircraft tipping alarm 158 (see FIG. 7) which notifies a cargo loading operator 160*a* (see FIG. 7) and/or other ground personnel responsible for the loading of the aircraft 10 (see FIG. 1A), and if appropriate, to an automated cargo handling system 174 (see FIG. 7), that prevents further movement of cargo 32 (see FIG. 1A) into and/or rearward in the aircraft 10 (see FIG. 1A) when the aircraft 10 (see FIG. 1A) begins to approach the potential aircraft tipping back position 144 (see FIG. 7) or threshold of a tipping back position.

The potential aircraft tipping back position 144 (see FIG. 7) is preferably indicated when a reduction of pressure 146 (see FIG. 7) of the hydraulic fluid 60 (see FIG. 4), such as in the form of oleo fluid 60*a* (see FIG. 4), in the NLG shock strut 40 (see FIG. 4), sensed via the pressure sensor device 98 (see FIG. 4), is greater than or equal to a pressure reduction threshold 149 (see FIG. 7). In one embodiment, the potential aircraft tipping back position 144 is indicated when the reduction of pressure 146 of the hydraulic fluid 60 in the NLG shock strut 40, sensed via the pressure sensor device 98, is greater than or equal to fifty percent (50%) of a predetermined pressure level 148 (see FIG. 7) of the hydraulic fluid 60 (see FIG. 4), such as in the form of oleo fluid 60*a* (see FIG. 4), in the NLG shock strut 40 (see FIG. 4).

The pressure reduction threshold 149 (see FIG. 7) is the point at which the reduction of pressure 146 (see FIG. 7) of the hydraulic fluid 60 (see FIG. 4), such as in the form of oleo fluid 60*a* (see FIG. 4), generates and transmits with the pressure sensor device 98 (see FIG. 7) an aircraft tipping alarm signal 156 (see FIG. 7), to indicate a potential aircraft tipping back position 144 (see FIG. 7). For example, in one embodiment, the pressure reduction threshold 149 (see FIG. 7) is the point at which the reduction of pressure 146 (see FIG. 7) of the hydraulic fluid 60 (see FIG. 7) in the NLG shock strut 40 (see FIG. 7), sensed via the pressure sensor device 98 (see FIG. 7), is greater than or equal to fifty percent (50%) of the predetermined pressure level 148 (see FIG. 7), indicating the potential aircraft tipping back position 144 (see FIG. 7).

The predetermined pressure level 148 (see FIG. 7) may be determined based on specific conditions of the aircraft 10 (see FIG. 1A), such as the cargo aircraft 10*a* (see FIG. 1A). Such specific conditions may comprise the empty weight of the aircraft 10 (see FIG. 1A), such as the cargo aircraft 10*a* (see FIG. 1A), the fully loaded weight of the aircraft 10 (see FIG. 1A), such as the cargo aircraft 10*a* (see FIG. 1A), the slope of the surface where the aircraft 10 (see FIG. 1A), such as the cargo aircraft 10*a* (see FIG. 1A), is located or positioned on the ground, wind conditions surrounding the indoor or outdoor loading and unloading of the aircraft 10 (see FIG. 1A), or other specific conditions. The pressure reduction threshold 149 (see FIG. 7) of 50% of the predetermined pressure level 148 (see FIG. 7), is in relation to a condition where the upward movement of the aircraft nose 12 (see FIG. 1A) in relation to pressure reduction in the nose landing gear (NLG) assembly 20 (see FIG. 1A) is visually detectable. The purpose of the 50% may be related to the fact that during loading and unloading of the aircraft 10 (see FIG. 1A), the limited transient lifting of the aircraft 10 (see FIG. 1A) due to a wind gust should not trigger the aircraft tipping alarm signal 156 (see FIG. 7), The reduction of pressure 146 (see FIG. 7) of the hydraulic fluid 60 (see FIG. 4), such as in the form of oleo fluid 60*a* (see FIG. 4), in the NLG shock strut 40 (see FIGS. 4, 7) for indicating the potential aircraft tipping back position 144 (see FIG. 7) may be adjustable upward or downward. For example, if there are environmental factors, such as a windy condition, the reduction of pressure 146 (see FIG. 7) of the hydraulic fluid 60 (see FIG. 4) may be adjusted accordingly to compensate for the windy condition. Thus, the NLG shock strut 40 (see FIG. 4) may have an adjustable pressure variance of a normal pre-loaded pressure for initiating or generating the aircraft tipping alarm signal 156.

The elongated pressure chamber assembly 50 (see FIGS. 4, 5A-5B) further comprises an elongated pressure chamber 84 (see FIGS. 4, 5A-6B) with one or two spring loaded one-way valves 89 (see FIGS. 5A-6B). The spring loaded one-way valves 89 (see FIGS. 5A-6B) preferably comprise a first check valve 90 (see FIGS. 4, 5A) and a second check valve 92 (see FIGS. 4, 5A). As used herein, "check valve" means a valve that allows fluid, such as a liquid or a gas, to flow through it in only one direction. The first check valve 90 is preferably an elongated pressure chamber 84-to-nose landing gear shock strut 40 check valve configured to restrict fluid flow only into the nose landing gear shock strut 40. The second check valve 92 is preferably a fluid pump and supply assembly 106-to-elongated pressure chamber 84 check valve configured to restrict fluid flow only into the elongated pressure chamber 84.

As shown in FIG. 4, the elongated pressure chamber assembly 50 comprises the first check valve 90 positioned at the first end 86 (see FIG. 4) of the elongated pressure chamber 84 (see FIG. 4). The first check valve 90 (see FIG. 4) is configured to restrict hydraulic fluid flow 142 (see FIG. 7), such as oleo fluid flow 142*a* (see FIG. 7), only into the NLG shock strut 40. The first check valve 90 (see FIG. 4) is preferably embedded within the NLG shock strut 40 (see FIG. 4). As shown in FIG. 4, the elongated pressure chamber assembly 50 further comprises the second check valve 92 positioned at the second end 88 (see FIG. 4) of the elongated pressure chamber 84 (see FIG. 4). The second check valve 92 (see FIG. 4) is configured to restrict hydraulic fluid flow 142 (see FIG. 7), such as oleo fluid flow 142*a* (see FIG. 7), only into the elongated pressure chamber 84. The second check valve 92 (see FIG. 5A) includes an externally threaded open end portion 126 (see FIG. 5A) configured for coupling to the fluid pump and supply assembly 106 (see FIGS. 4, 5A).

As shown in FIG. 4, the fluid pump and supply assembly 106, such as a gas/oleo pump and supply assembly 106*a*, is coupled to the second end 88 of the elongated pressure chamber 84. The fluid pump and supply assembly 106 (see FIG. 4) pumps gas 64 (see FIGS. 3, 7) and hydraulic fluid 60 (see FIGS. 3, 7), such as oleo fluid 60*a* (see FIGS. 3, 7), into the elongated pressure chamber 84 (see FIG. 4), which, in turn, pumps the gas 64 (see FIGS. 3, 7) and the hydraulic fluid 60 (see FIGS. 3, 7), such as oleo fluid 60*a* (see FIGS. 3, 7), into the NLG shock strut 40. Thus, the elongated pressure chamber 84 (see FIG. 4) preferably acts as a conduit for flowing the hydraulic fluid 60 (see FIGS. 4, 5A), such as oleo fluid 60*a* (see FIGS. 4, 5A) from the fluid pump and supply assembly 106 (see FIGS. 4, 5A) to the NLG shock strut 40 (see FIGS. 4, 5A).

In use, the pump pressure of the fluid pump and supply assembly 106 overcomes the spring loaded one-way valve 89, such as in the form of second check valve 92, positioned at the second end 88 of the elongated pressure chamber 84, and pumps the gas 64 (see FIG. 7) and the hydraulic fluid 60 (see FIGS. 5A, 7), such as oleo fluid 60*a* (see FIGS. 5A, 7), into the elongated pressure chamber 84. The gas 64 (see FIG. 7) and the hydraulic fluid 60 (see FIGS. 5A, 7), such as oleo fluid 60*a* (see FIGS. 5A, 7), pressure within the elongated pressure chamber 84 then overcomes the spring loaded one-way valve 89, such as in the form of first check valve 90, positioned at the first end 86 of the elongated pressure chamber 84, and the gas 64 (see FIG. 7) and the hydraulic fluid 60 (see FIGS. 5A, 7), such as oleo fluid 60*a* (see FIGS. 5A, 7), flow into the NLG shock strut 40 (see FIGS. 4, 5A), until the predetermined pressure level 148 (see FIG. 7) is achieved.

As shown in FIG. 4, the elongated pressure chamber assembly 50 further comprises a reduced diameter breakable neck section 94. The reduced diameter breakable neck section 94 (see FIG. 4) is preferably configured to break away from the NLG shock strut 40 (see FIG. 4) when an impact event 162 (see FIG. 7) occurs on take-off or initial flight, such as a bird strike 162*a* (see FIG. 7). Upon breakage of the reduced diameter breakable neck section 94 (see FIG. 4), only the first check valve 90 (see FIG. 4) remains engaged to the aperture 82 (see FIG. 4), preventing the oleo fluid 60*a* (see FIG. 4) from exiting the NLG shock strut 40 (see FIG. 4).

As shown in FIG. 4, the aircraft tipping alarm system 80 further comprises the alarm control system 100. The alarm control system 100 (see FIG. 4) preferably comprises one or more of a controller 164 (see FIG. 7), a power source 166 (see FIG. 7), an aircraft tipping alarm apparatus 168 (see FIG. 7), one or more display units 170 (see FIG. 7), a system logic 172 (see FIG. 7), a cargo handling system deactivator device 176 (see FIG. 7), or other suitable alarm control system components. The alarm control system 100 (see FIG. 4) may be operable to deactivate a cargo handling system 174 (see FIG. 7) upon receipt of the aircraft tipping alarm signal 156 (see FIG. 7).

The controller 164 (see FIG. 7) may comprise a processor, such as in the form of a computer comprising hardware and software, and memory in communication with the processor or computer, or another suitable controller device. The power source 166 (see FIG. 7) may comprise an electrical power source, a battery, a pneumatic power source, or another suitable power source. The aircraft tipping alarm apparatus 168 (see FIG. 7) may comprise a mounted unit in mounted in the cargo bay 30 (see FIG. 1A) or in another area of the aircraft 10 (see FIG. 1A), a portable unit carried by a cargo loading operator 160*a* (see FIG. 7), or another suitable aircraft tipping alarm apparatus. The one or more display units 170 (see FIG. 7) may comprise a screen or window on the aircraft tipping alarm apparatus 168 (see FIG. 7) or separate from the aircraft tipping alarm apparatus 168, or another suitable display unit.

The system logic 172 (see FIG. 7) may comprise software, an algorithm or another suitable system logic. The system logic 172 (see FIG. 7) may be in the controller 164 (see FIG. 7) or in the aircraft tipping alarm apparatus 168 (see FIG. 7), and the system logic 172 (see FIG. 7), if it is present and used, will preferably take the aircraft tipping alarm signal 156 (see FIG. 7) from the pressure sensor device 98 (see FIGS. 4, 7) and go through a series of decisions or a logic to decide whether or not to trigger the aircraft tipping alarm 158 (see FIG. 7).

The cargo handling system deactivator device 176 (see FIG. 7) may comprise an automatic or manual device that deactivates a cargo handling system 174 (see FIG. 7), when the aircraft tipping alarm signal 156 (see FIG. 7) triggers or activates the aircraft tipping alarm 158 (see FIG. 7). The aircraft tipping alarm system 80 (see FIG. 4) with the alarm control system 100 (see FIG. 4) may be powered only during ground handling, thereby preventing any nuisance messages or false alarms during airplane taxi, take-off, flight or landing operations.

Figure 5A:
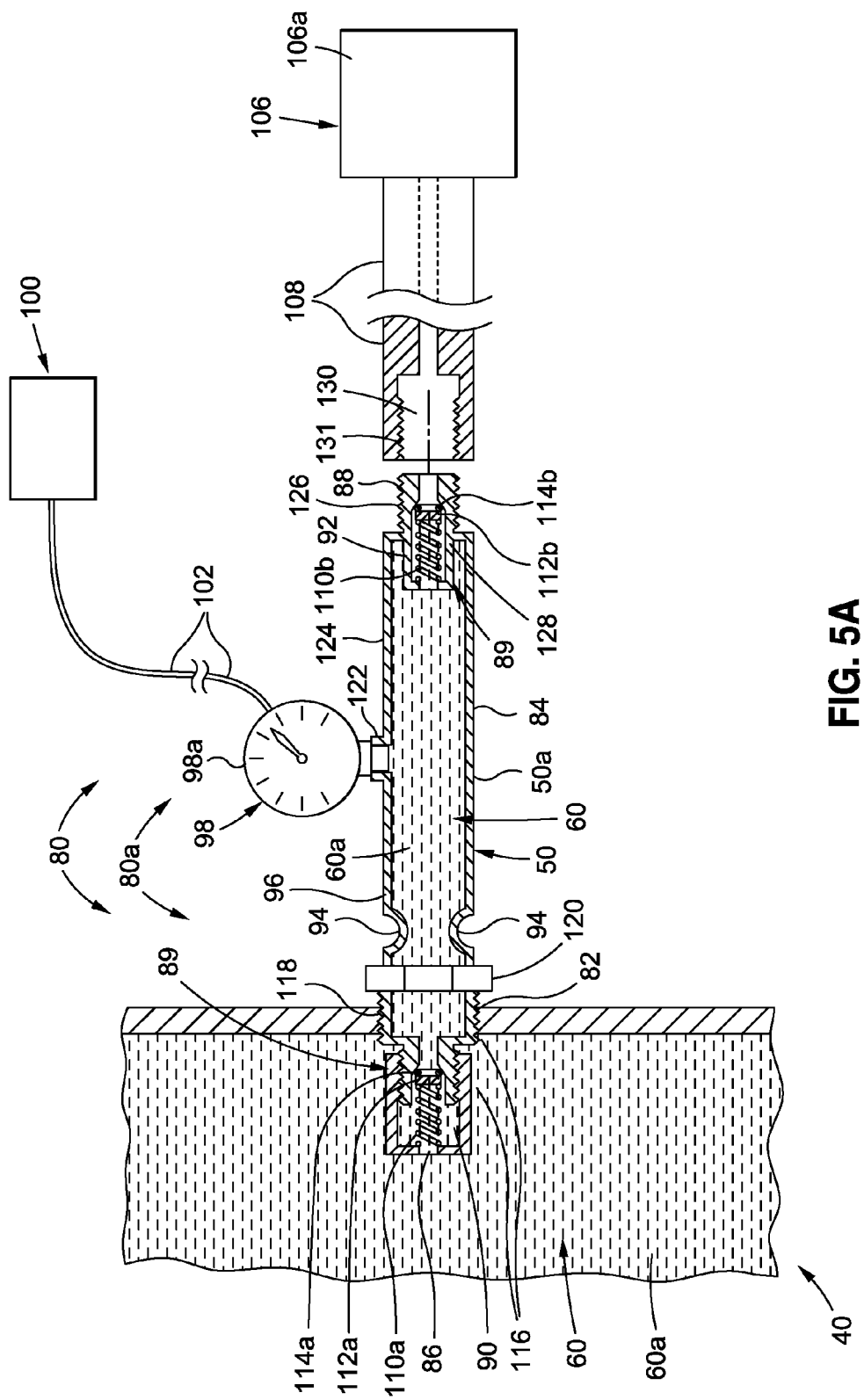
FIG. 5A is a partial cross-sectional close-up view of an embodiment of an aircraft tipping alarm system of the disclosure having an elongated pressure chamber assembly with a mechanical gauge pressure sensor and two spring loaded one-way valves.

Referring to FIG. 5A, FIG. 5A is a partial cross-sectional close-up view of an embodiment of an aircraft tipping alarm system 80, such as in the form of aircraft tipping alarm system 80*a*, of the disclosure having an elongated pressure chamber assembly 50, such as in the form of elongated pressure chamber assembly 50*a*. The elongated pressure chamber assembly 50 (see FIG. 5A), such as in the form of elongated pressure chamber assembly 50*a* (see FIG. 5A), comprises a pressure sensor device 98 (see FIG. 5A), such as in the form of mechanical gauge pressure sensor 98*a* (see FIG. 5A), and comprises two spring loaded one-way valves 89 (see FIG. 5A), such as in the form of first check valve 90 (see FIG. 5A) and second check valve 92 (see FIG. 5A).

FIG. 5A shows the elongated pressure chamber assembly 50 with two spring loaded one-way valves 89, one on each end of the elongated pressure chamber 84, and a reduced diameter breakable neck section 94 formed at a portion 96 on the elongated pressure chamber 84. The elongated pressure chamber 84 (see FIG. 5A) preferably contains hydraulic fluid 60 (see FIG. 5A), such as in the form of oleo fluid 60*a* (see FIG. 5A), pumped from the fluid pump and supply assembly 106 (see FIG. 5A) into the elongated pressure chamber 84 (see FIG. 5A). The NLG shock strut 40 (see FIG. 5A) also preferably contains hydraulic fluid 60 (see FIG. 5A), such as in the form of oleo fluid 60*a* (see FIG. 5A), pumped from the fluid pump and supply assembly 106 (see FIG. 5A) via the elongated pressure chamber 84 (see FIG. 5A) acting as a conduit.

FIG. 5A shows the pressure sensor device 98, such as in the form of mechanical gauge pressure sensor 98*a*, coupled exterior to a portion 122 of the elongated pressure chamber 84. The pressure sensor device 98 (see FIG. 5A) is configured and designed to sense a pressure 154 (see FIG. 7) in the elongated pressure chamber 84 (see FIG. 5A). The pressure sensor device 98 (see FIG. 5A) is preferably connected to the alarm control system 100 (see FIG. 5A) via the wired connection 102 (see FIG. 5A) or via a wireless connection (not shown).

The elongated pressure chamber 84 (see FIG. 5A) is preferably coupled between the pressure sensor device 98 (see FIG. 5A) and the NLG shock strut 40 (see FIG. 5A). The elongated pressure chamber 84 (see FIG. 5A) preferably has a substantially cylindrical configuration 124 (see FIG. 5A). However, the elongated pressure chamber 84 (see FIG. 5A) may have another suitable configuration.

The elongated pressure chamber assembly 50 shown in FIG. 5A is installed on the NLG shock strut 40. As shown in FIG. 5A, the first end 86 of the elongated pressure chamber 84 is preferably embedded within the NLG shock strut 40, and the second end 88 of the elongated pressure chamber 84 is preferably external to the NLG shock strut 40.

FIG. 5A shows the first end 86 of the elongated pressure chamber 84 inserted through the aperture 82 of the NLG shock strut 40 and attached to the NLG shock strut 40 via an attachment element 120, such as a hex nut, or other suitable attachment element. The elongated pressure chamber 84 (see FIG. 5A) may further have a threaded connector portion 118 (see FIG. 5A) preferably embedded within the NLG shock strut 40 (see FIG. 5A). The first end 86 (FIG. 5A) with the first check valve 90 (see FIG. 5A) and the threaded connector portion 118 (see FIG. 5A) are shown embedded at interior portions 116 (see FIG. 5A) of the NLG shock strut 40 (see FIG. 5A).

As shown in FIG. 5A, the spring loaded one-way valve 89, such as in the form of first check valve 90, preferably comprises a spring 110a, a valve 112a, and an O-ring 114a. As further shown in FIG. 5A, the spring loaded one-way valve 89, such as in the form of second check valve 92, preferably comprises a spring 110b, a valve 112b, and an O-ring 114b. The second check valve 92 (see FIG. 5A) is shown positioned at an interior portion 128 (see FIG. 5A) of the elongated pressure chamber 84 (see FIG. 5A).

The second end 88 (see FIG. 5A) of the elongated pressure chamber 84 (see FIG. 5A) further comprises an externally threaded open end portion 126 (see FIG. 5A). The externally threaded open end portion 126 (see FIG. 5A) is preferably configured for attachment to the fluid pump and supply assembly 106 (see FIG. 5A), such as in the form of gas/oleo pump and supply assembly 106a (see FIG. 5A), via the fluid pump and supply attachment 108 (see FIG. 5A). As shown in FIG. 5A, the fluid pump and supply attachment 108 preferably has an open end attachment portion 130 with internal threads 131 configured for attachment to the externally threaded open end portion 126 at the second end 88 (see FIG. 5A) of the elongated pressure chamber 84.

Figure 5B:
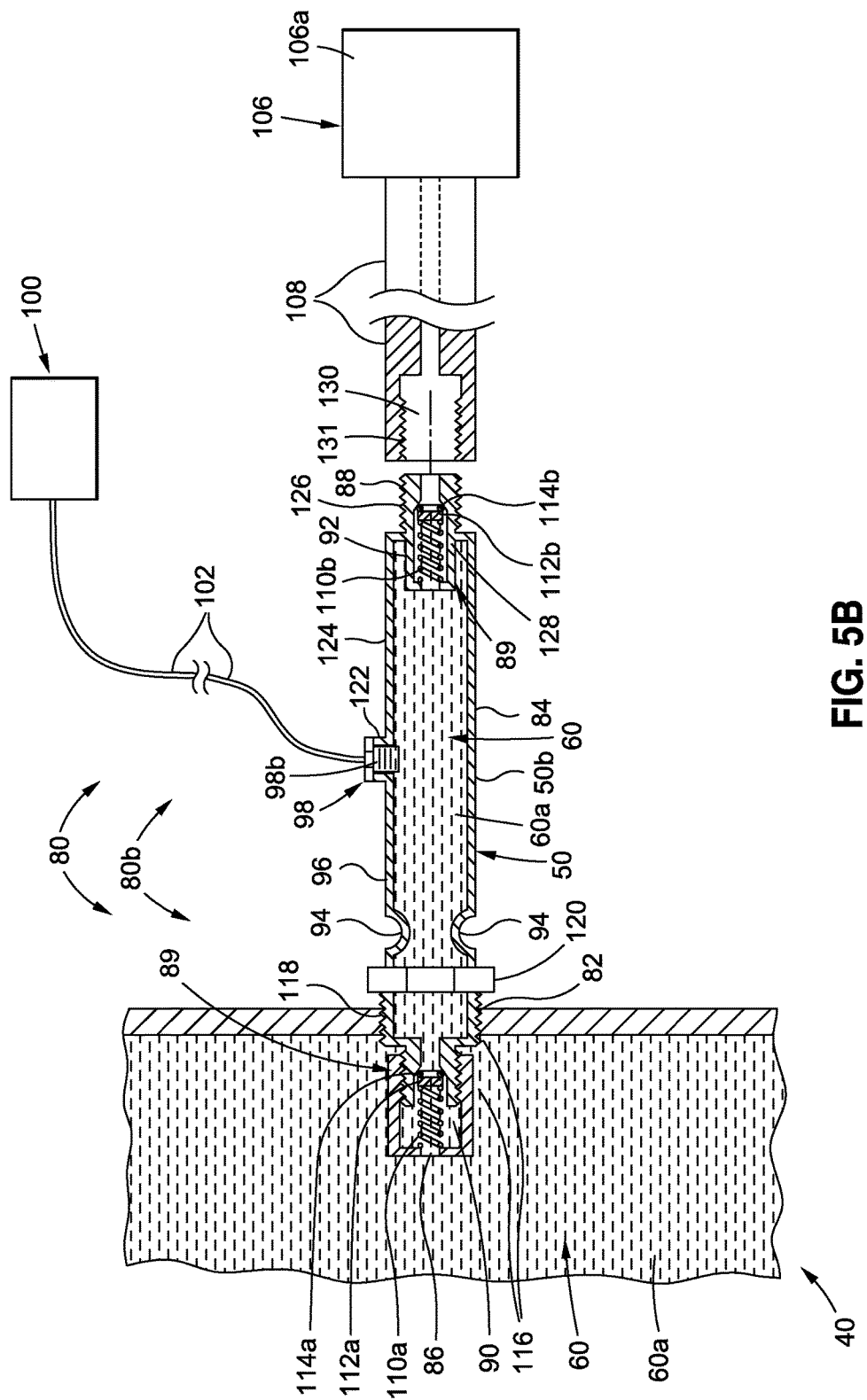
FIG. 5B is a partial cross-sectional close-up view of another embodiment of an aircraft tipping alarm system of the disclosure having an elongated pressure chamber assembly with a piezoelectric pressure sensor and two spring loaded one-way valves.

Referring to FIG. 5B, FIG. 5B is a partial cross-sectional close-up view of another embodiment of an aircraft tipping alarm system 80, such as in the form of aircraft tipping alarm system 80b, of the disclosure having an elongated pressure chamber assembly 50, such as in the form of elongated pressure chamber assembly 50b. The elongated pressure chamber assembly 50 (see FIG. 5B), such as in the form of elongated pressure chamber assembly 50b (see FIG. 5B), comprises a pressure sensor device 98 (see FIG. 5B), such as in the form of piezoelectric pressure sensor 98b (see FIG. 5B), and comprises two spring loaded one-way valves 89 (see FIG. 5B), such as in the form of first check valve 90 (see FIG. 5B) and second check valve 92 (see FIG. 5B).

The aircraft tipping alarm system 80, such as in the form of aircraft tipping alarm system 80b, in FIG. 5B is identical to the aircraft tipping alarm system 80 of FIG. 5A, except that the pressure sensor device 98 (see FIG. 5B) is in the form of a piezoelectric pressure sensor 98b (see FIG. 5B) instead of in the form of mechanical gauge pressure sensor 98a (see FIG. 5A). As shown in FIG. 5B, the piezoelectric pressure sensor 98b is coupled interior to the portion 122 (see FIG. 5B) of the elongated pressure chamber 84 (see FIG. 5B).

Figure 6A:
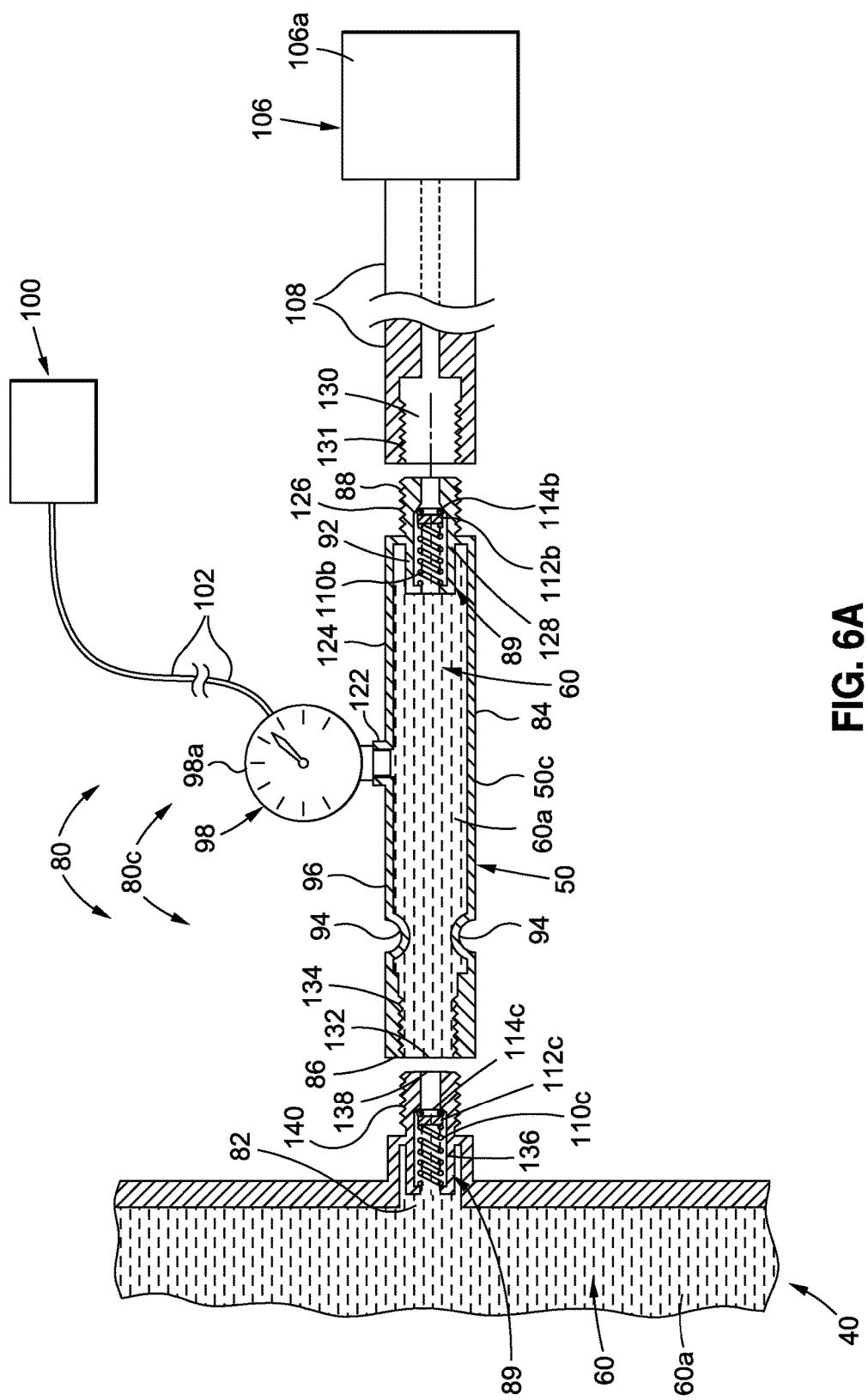
FIG. 6A is a partial cross-sectional close-up view of yet another embodiment of an aircraft tipping alarm system of the disclosure having an elongated pressure chamber assembly with a mechanical gauge pressure sensor and one spring loaded one-way valve.
Figure 6B:
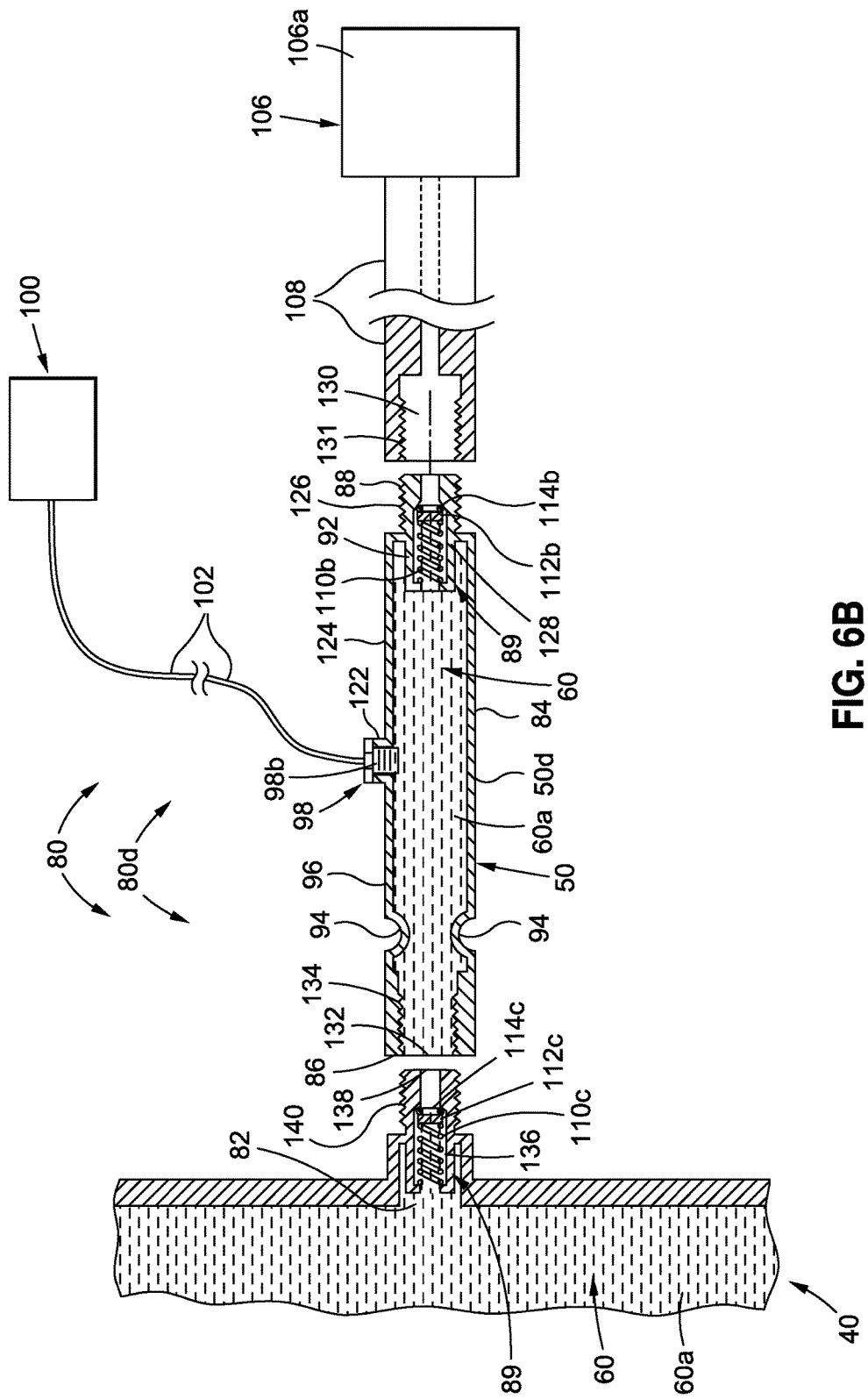
FIG. 6B is a partial cross-sectional close-up view of yet another embodiment of an aircraft tipping alarm system of the disclosure having an elongated pressure chamber assembly with a piezoelectric pressure sensor and one spring loaded one-way valve.

FIGS. 6A-6B show an alternate embodiment of the elongated pressure chamber assembly 50 with elongated pressure chamber 84, of the aircraft tipping alarm system 80, that may be used with an existing NLG shock strut 40 that includes, or may be retrofitted with, a spring loaded one-way valve 89 in the form of a nose landing gear (NLG) check valve 136. The NLG check valve 136 (see FIGS. 6A-6B) may be used in place of the spring loaded one-way valve 89, in the form of the first check valve 90 (see FIGS. 5A-5B), on the elongated pressure chamber 84 (see FIGS. 5A-B).

Referring to FIG. 6A, FIG. 6A is a partial cross-sectional close-up view of yet another embodiment of an aircraft tipping alarm system 80, such as in the form of aircraft tipping alarm system 80c, of the disclosure having an elongated pressure chamber assembly 50, such as in the form of elongated pressure chamber assembly 50c. The elongated pressure chamber assembly 50 (see FIG. 6A), such as in the form of elongated pressure chamber assembly 50c (see FIG. 6A), comprises the pressure sensor device 98 (see FIG. 6A), such as in the form of mechanical gauge pressure sensor 98a (see FIG. 6A), and comprises one spring loaded one-way valve 89 (see FIG. 6A), such as in the form of second check valve 92 (see FIG. 6A).

In this alternate embodiment, as shown in FIGS. 6A-6B, the first check valve 90 (see FIGS. 5A-5B) at the first end 86 (see FIGS. 6A-6B) of the elongated pressure chamber 84 (see FIGS. 6A-6B) is replaced with an open end portion 132 having internal threads 134. The open end portion 132 (see FIGS. 6A-6B) is preferably configured to couple with the spring loaded one-way valve 89 (see FIGS. 6A-6B), such as in the form of the NLG check valve 136 (see FIGS. 6A-6B) located on the NLG shock strut 40 (see FIGS. 6A-6B). The NLG check valve 136 (see FIGS. 6A-6B) is preferably configured to restrict hydraulic fluid flow 142 (see FIG. 7) only into the NLG shock strut 40 (see FIGS. 6A-6B).

As shown in FIG. 6A, the spring loaded one-way valve 89, such as in the form of NLG check valve 136, preferably comprises a spring 110c, a valve 112c, and an O-ring 114c. The NLG check valve 136 (see FIG. 6A) is shown positioned at the aperture 82 (see FIG. 6A) on the NLG shock strut 40 (see FIG. 6A). The NLG shock strut 40 (see FIG. 6A) contains hydraulic fluid 60 (see FIG. 6A), such as in the form of oleo fluid 60a (see FIG. 6A).

As further shown in FIG. 6A, the NLG check valve 136 is preferably coupled to an open end portion 138 having external threads 140. The open end portion 138 (see FIG. 6A) with its external threads 140 (see FIG. 6A) is preferably configured to attach to the internal threads 134 (see FIG. 6A) of the open end portion 132 (see FIG. 6A) of the elongated pressure chamber 84 (see FIG. 6A).

Alternatively, the open end portion 138 (see FIG. 6A) may have internal threads (not shown), and the open end portion 132 (see FIG. 6A) of the elongated pressure chamber 84 (see FIG. 6A) may have external threads (not shown). In this embodiment, the internal threads (not shown) of the open end portion 138 (see FIG. 6A) are configured for attachment and connection to the external threads (not shown) of the open end portion 132 (see FIG. 6A) of the elongated pressure chamber 84 (see FIG. 6A).

FIG. 6A shows the elongated pressure chamber assembly 50 with one spring loaded one-way valve 89 at the second end 88 of the elongated pressure chamber 84, and shows the reduced diameter breakable neck section 94 formed at portion 96 on the elongated pressure chamber 84. The elongated pressure chamber 84 (see FIG. 6A) preferably contains hydraulic fluid 60 (see FIG. 6A), such as in the form of oleo fluid 60a (see FIG. 6A), pumped from the fluid pump and supply assembly 106 (see FIG. 6A) into the elongated pressure chamber 84 (see FIG. 6A). The NLG shock strut 40 (see FIG. 6A) also preferably contains hydraulic fluid 60 (see FIG. 6A), such as in the form of oleo fluid 60a (see FIG. 6A), pumped from the fluid pump and supply assembly 106 (see FIG. 6A) via the elongated pressure chamber 84 (see FIG. 6A) acting as a conduit.

FIG. 6A shows the pressure sensor device 98, such as in the form of mechanical gauge pressure sensor 98a, coupled exterior to portion 122 of the elongated pressure chamber 84. The pressure sensor device 98 (see FIG. 6A) is configured and designed to sense a pressure 154 (see FIG. 7) in the elongated pressure chamber 84 (see FIG. 6A). The pressure sensor device 98 (see FIG. 6A) is preferably connected to the alarm control system 100 (see FIG. 6A) via the wired connection 102 (see FIG. 6A) or via a wireless connection (not shown).

The elongated pressure chamber 84 (see FIG. 6A) is preferably coupled between the pressure sensor device 98 (see FIG. 6A) and the NLG shock strut 40 (see FIG. 6A). The elongated pressure chamber 84 (see FIG. 6A) preferably has a substantially cylindrical configuration 124 (see FIG. 6A). However, the elongated pressure chamber 84 (see FIG. 6A) may have another suitable configuration.

As shown in FIG. 6A, the spring loaded one-way valve 89, such as in the form of second check valve 92, preferably comprises a spring 110b, a valve 112b, and an O-ring 114b. The second check valve 92 (see FIG. 6A) is shown positioned at an interior portion 128 (see FIG. 6A) of the elongated pressure chamber 84 (see FIG. 6A).

The second end 88 (see FIG. 6A) of the elongated pressure chamber 84 (see FIG. 6A) further comprises the externally threaded open end portion 126 (see FIG. 6A). The externally threaded open end portion 126 (see FIG. 6A) is preferably configured for attachment to the fluid pump and supply assembly 106 (see FIG. 6A), such as in the form of gas/oleo pump and supply assembly 106a (see FIG. 6A), via the fluid pump and supply attachment 108 (see FIG. 6A). As shown in FIG. 6A, the fluid pump and supply attachment 108 preferably has an open end attachment portion 130 with internal threads 131 configured for attachment to the externally threaded open end portion 126 at the second end 88 (see FIG. 6A) of the elongated pressure chamber 84.

Referring to FIG. 6B, FIG. 6B is a partial cross-sectional close-up view of yet another embodiment of an aircraft tipping alarm system 80, such as in the form of aircraft tipping alarm system 80d, of the disclosure having an elongated pressure chamber assembly 50, such as in the form of elongated pressure chamber assembly 50d. The elongated pressure chamber assembly 50 (see FIG. 6B), such as in the form of elongated pressure chamber assembly 50d (see FIG. 6B), comprises the pressure sensor device 98 (see FIG. 6B), such as in the form of piezoelectric pressure sensor 98b (see FIG. 6B), and comprises one spring loaded one-way valve 89 (see FIG. 6B), such as in the form of second check valve 92 (see FIG. 6B).

The aircraft tipping alarm system 80, such as in the form of aircraft tipping alarm system 80d, in FIG. 6B is identical to the aircraft tipping alarm system 80 of FIG. 6A, except that the pressure sensor device 98 (see FIG. 6B) is in the form of a piezoelectric pressure sensor 98b (see FIG. 6B) instead of in the form of mechanical gauge pressure sensor 98a (see FIG. 6A). As shown in FIG. 6B, the piezoelectric pressure sensor 98b is coupled interior to the portion 122 (see FIG. 6B) of the elongated pressure chamber 84 (see FIG. 6B).

In another embodiment, as shown in FIG. 7, there is provided an aircraft 10, such as a cargo aircraft 10a, with an aircraft tipping alarm system 80. FIG. 7 is an illustration of a functional block diagram showing an exemplary embodiment of an aircraft 10, such as a cargo aircraft 10a, having an aircraft tipping alarm system 80 of the disclosure. The aircraft 10 (see FIGS. 1A, 7), such as the cargo aircraft 10a (see FIGS. 1A, 7), comprises a fuselage 14 (see FIG. 1A), at least one wing 18 (see FIG. 1A) coupled to the fuselage 14 (see FIG. 1A), at least two main landing gear assemblies 22 (see FIG. 1A) coupled to the fuselage 14 (see FIG. 1A), and a nose landing gear (NLG) assembly 20 (see FIGS. 1A, 7) coupled to the fuselage 14 (see FIG. 1A). The cargo aircraft 10a (see FIG. 7) comprises a cargo bay 30 (see FIG. 7) with cargo 32 (see FIG. 7).

The aircraft 10 (see FIG. 7), such as a cargo aircraft 10a (see FIG. 7), further comprises the aircraft tipping alarm system 80 (see FIG. 7), which is preferably coupled to the nose landing gear (NLG) assembly 20 (see FIG. 7). The NLG assembly 20 (see FIG. 7) comprises the nose landing gear (NLG) shock strut 40 (see FIG. 7). During loading of the cargo aircraft 10a (see FIG. 7), the NLG assembly 20 (see FIG. 7) and the NLG shock strut 40 (see FIG. 7) are under load 178 (see FIG. 7). The NLG shock strut 40 (see FIG. 7) may comprise a nose landing gear (NLG) oleo pneumatic shock strut 40a (see FIG. 3) containing oleo fluid 60a (see FIG. 3) and gas 64 (see FIG. 7), such as in the form of dry nitrogen gas 64a (see FIG. 7), or may comprise another suitable type of NLG shock strut 40 (see FIG. 7).

As shown in FIG. 7, the NLG shock strut 40 comprises an aperture 82, has a nose landing gear (NLG) shock strut pressure 152, and contains hydraulic fluid 60, such as in the form of oleo fluid 60a. As further shown in FIG. 7, the hydraulic fluid 60 has a hydraulic fluid flow 142 with a hydraulic fluid pressure 150, and the oleo fluid 60a has an oleo fluid flow 142a with an oleo fluid pressure 150a.

As shown in FIG. 7, the aircraft tipping alarm system 80 further comprises an elongated pressure chamber assembly 50 having an elongated pressure chamber 84, and a pressure sensor device 98. The elongated pressure chamber assembly 50 (see FIG. 7), and in particular, a first end 86 (see FIG. 7) of the elongated pressure chamber 84 (see FIG. 7) is configured to engage to the aperture 82 (see FIG. 7) of the NLG shock strut 40 (see FIG. 7). The elongated pressure chamber assembly 50 (see FIG. 7), and in particular, a second end 88 (see FIG. 7) of the elongated pressure chamber 84 (see FIG. 7) is configured to engage to the fluid pump and supply assembly 106 (see FIG. 7), such as in the form of the gas/oleo pump and supply assembly 106a (see FIG. 7). The elongated pressure chamber 84 (see FIG. 7) has a pressure 154 (see FIG. 7).

The elongated pressure chamber 84 (see FIG. 7) of the elongated pressure chamber assembly 50 (see FIG. 7) further comprises, in one embodiment, two spring loaded one-way valves 89 (see FIG. 7) comprising a first check valve 90 (see FIG. 7) and a second check valve 92 (see FIG. 7), and in another embodiment, one spring loaded one-way valve 89 (see FIG. 7) comprising the second check valve 92 (see FIG. 7). The first check valve 90 (see FIG. 7) is configured to restrict oleo fluid flow 142a (see FIG. 7) only into the NLG shock strut 40 (see FIG. 7). The second check valve 92 (see FIG. 7) is configured to restrict oleo fluid flow 142a (see FIG. 7) only into the elongated pressure chamber 84 (see FIG. 7). The second check valve 92 (see FIG. 7) has an externally threaded open end portion 126 (see FIG. 7) configured for coupling to the fluid pump and supply assembly 106 (see FIG. 7).

In another embodiment, the first check valve 90 (see FIG. 7) may be replaced with an open end portion 132 (see FIG. 7) configured to couple with a nose landing gear (NLG) check valve 136 (see FIG. 7) on the NLG shock strut 40 (see FIG. 7). The NLG check valve 136 (see FIG. 7) is configured to restrict oleo fluid flow 142a (see FIG. 7) only into the NLG shock strut 40 (see FIG. 7).

The elongated pressure chamber assembly 50 further comprises a reduced diameter breakable neck section 94 (see FIG. 7) configured to break away from the NLG shock strut 40 (see FIG. 7) in an impact event 162 (see FIG. 7), such as a bird strike 162a (see FIG. 7). Upon breakage of the reduced diameter breakable neck section 94 (see FIG. 7), only the first check valve 90 (see FIG. 7) remains engaged to the aperture 82 (see FIG. 7) of the NLG shock strut 40 (see FIG. 7), preventing the oleo fluid 60*a* (see FIG. 7) from exiting the NLG shock strut 40 (see FIG. 7).

As shown in FIG. 7, the aircraft tipping alarm system 80 further comprises an alarm control system 100 preferably comprises one or more of a controller 164, a power source 166, an aircraft tipping alarm apparatus 168, one or more display units 170, a system logic 172, and a cargo handling system deactivator element 176. The alarm control system 100 (see FIG. 7) is discussed in more detail above.

A potential aircraft tipping back position 144 (see FIG. 7) is indicated when a reduction of pressure 146 (see FIG. 7) of the oleo fluid 60*a* (see FIG. 7) in the NLG shock strut 40 (see FIG. 7), sensed via the pressure sensor device 98 (see FIG. 7), is greater than or equal to a pressure reduction threshold 149 (see FIG. 7). In one embodiment, the potential aircraft tipping back position 144 is indicated when the reduction of pressure 146 of the hydraulic fluid 60 in the NLG shock strut 40, sensed via the pressure sensor device 98, is greater than or equal to fifty percent (50%) of a predetermined pressure level 148 (see FIG. 7) of the oleo fluid 60*a* in the NLG shock strut 40 (see FIG. 7). When the potential aircraft tipping back position 144 (see FIG. 7) is indicated, the pressure sensor device 98 (see FIG. 7) generates the aircraft tipping alarm signal 156 (see FIG. 7) to produce the aircraft tipping alarm 158 (see FIG. 7) that is sensible to a human being 160 (see FIG. 7), such as a cargo loading operator 160*a* (see FIG. 7).

Figure 8:
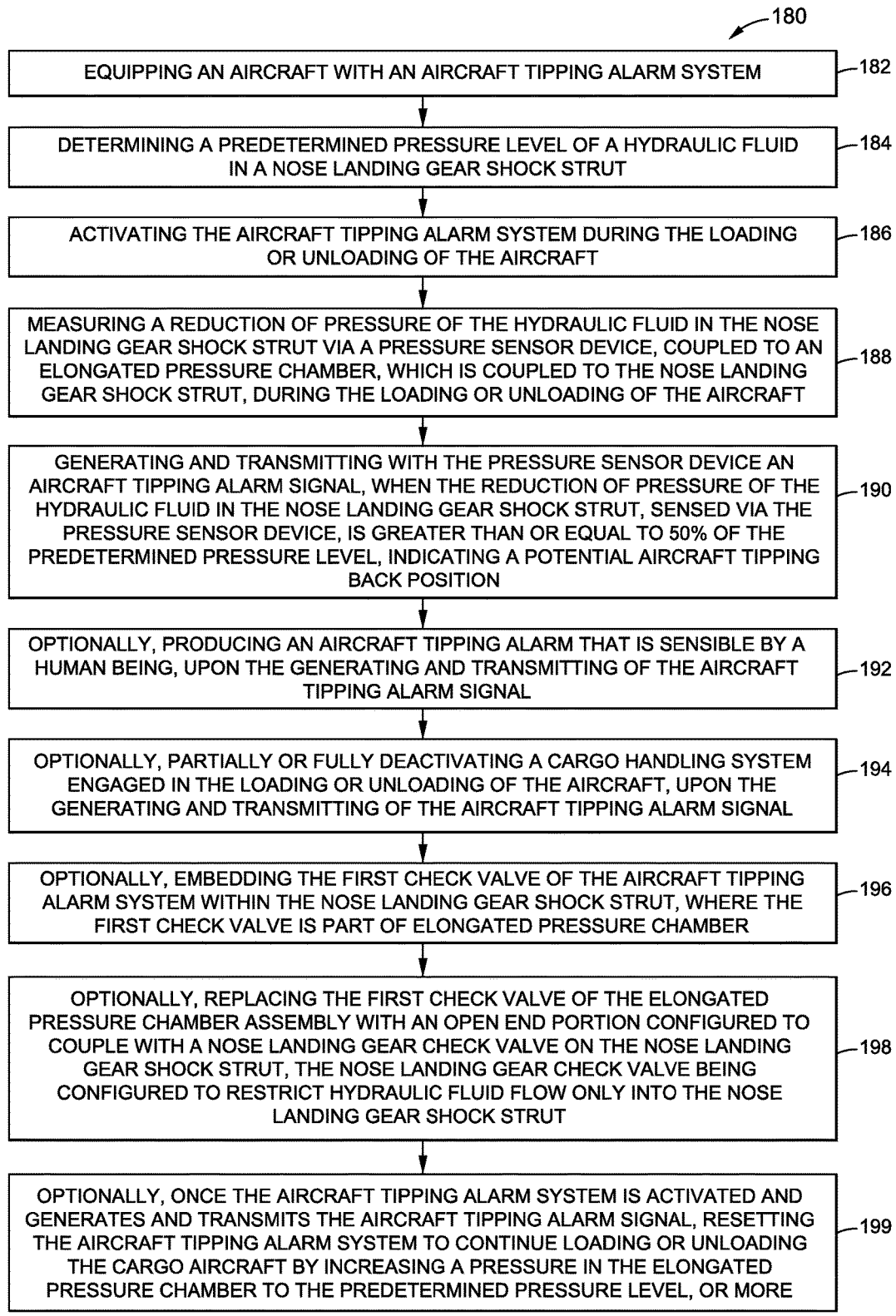
FIG. 8 is an illustration of a block flow diagram showing an exemplary embodiment of a method of the disclosure.

Referring to FIG. 8, in another embodiment, there is provided a method 180 for preventing and/or alarming against a tipping back position 38 (see FIG. 7) of an aircraft 10 (see FIG. 4) during a loading or unloading of the aircraft 10 (FIG. 4) on ground 24 (see FIG. 4). FIG. 8 is an illustration of a block flow diagram showing an exemplary embodiment of the method 180 of the disclosure.

As shown in FIG. 8, the method 180 comprises step 182 of equipping the aircraft 10 with an embodiment of one of the aircraft tipping alarm systems 80 (see FIGS. 4-6B) disclosed herein and discussed in detail above. Preferably, the aircraft tipping alarm system 80 (see FIGS. 4-6B) comprises an elongated pressure chamber assembly 50 coupled to a nose landing gear (NLG) shock strut 40 via a first check valve 90. The elongated pressure chamber assembly 50 comprises a pressure sensor device 98, and a reduced diameter breakable neck section 94. The step 182 of equipping the aircraft 10 (see FIG. 4) preferably comprises equipping a cargo aircraft 10*a* (see FIG. 4) with one of the aircraft tipping alarm systems 80 (see FIGS. 4-6B) disclosed herein and discussed in detail above.

As shown in FIG. 8, the method 180 further comprises step 184 of determining a predetermined pressure level 148 (see FIG. 7) of a hydraulic fluid 60 (see FIGS. 5A-6B), such as in the form of oleo fluid 60*a* (see FIGS. 5A-6B), in the NLG shock strut 40 (see FIGS. 5A-6B). As shown in FIG. 8, the method 180 further comprises step 186 of activating the aircraft tipping alarm system 80 (see FIGS. 4-6B) during the loading or unloading of the aircraft 10 (see FIG. 4).

As shown in FIG. 8, the method 180 further comprises step 188 of measuring a reduction of pressure 146 (see FIG. 7) of the hydraulic fluid 60 (see FIG. 4), such as in the form of oleo fluid 60*a* (see FIG. 4), in the NLG shock strut 40 (see FIGS. 4-6B), via the pressure sensor device 98 (see FIGS. 4-6B), during the loading or unloading of the aircraft 10 (see FIG. 4).

As shown in FIG. 8, the method 180 further comprises step 190 of generating and transmitting with the pressure sensor device 98 (see FIGS. 4-6B) the aircraft tipping alarm signal 156 (see FIG. 7), when the reduction of pressure 146 (see FIG. 7) of the hydraulic fluid 60 (see FIGS. 4-6B), such as in the form of oleo fluid 60*a* (see FIGS. 4-6B), in the NLG shock strut 40 (see FIGS. 4-6B), sensed via the pressure sensor device 98 (see FIGS. 4-6B), is greater than or equal to a pressure reduction threshold 149 (see FIG. 7). In one embodiment, the potential aircraft tipping back position 144 is indicated when the reduction of pressure 146 of the hydraulic fluid 60 in the NLG shock strut 40, sensed via the pressure sensor device 98, is greater than or equal to fifty percent (50%) of the predetermined pressure level 148 (see FIG. 7), indicating the potential aircraft tipping back position 144 (see FIG. 7).

As shown in FIG. 8, the method 180 further comprises optional step 192 of producing the aircraft tipping alarm 158 (see FIG. 7) that is sensible by a human being 160 (see FIG. 7), such as a cargo loading operator 160*a* (see FIG. 7), upon the generating and transmitting of the aircraft tipping alarm signal 156 (see FIG. 7).

As shown in FIG. 8, the method 180 further comprises optional step 194 of partially or fully deactivating a cargo handling system 174 (see FIG. 7) engaged in the loading or unloading of the aircraft 10 (see FIG. 4), upon the generating and transmitting of the aircraft tipping alarm signal 156 (see FIG. 7).

As shown in FIG. 8, the step 182 of equipping the aircraft 10 with the aircraft tipping alarm system 80 (see FIGS. 4-6B) of the method 180 further comprises optional step 196 of embedding the first check valve 90 (see FIGS. 5A-5B) of the aircraft tipping alarm system 80 (see FIGS. 5A-5B) within the NLG shock strut 40 (see FIG. 5A-5B), where the first check valve 90 (see FIGS. 5A-5B) is part of the elongated pressure chamber 84 (see FIGS. 5A-5B).

As shown in FIG. 8, the step 182 of equipping the aircraft 10 with the aircraft tipping alarm system 80 (see FIGS. 4-6B) of the method 180 further comprises optional step 198 of replacing the first check valve 90 (see FIGS. 5A-5B) of the elongated pressure chamber 84 (see FIGS. 5A-6B) of the elongated pressure chamber assembly 50 (see FIGS. 5A-5B), with an open end portion 132 (see FIGS. 6A-6B) configured to couple with a nose landing gear (NLG) check valve 136 (see FIGS. 6A-6B) on the NLG shock strut 40 (see FIGS. 6A-6B). The NLG check valve 136 (see FIGS. 6A-6B) is preferably configured to restrict hydraulic fluid flow 142 (see FIG. 7) only into the NLG shock strut 40 (see FIGS. 6A-6B).

As shown in FIG. 8, the method 180 may further comprise optional step 199 of once the aircraft tipping alarm system 80 (see FIGS. 4, 7) is activated and generates and transmits the aircraft tipping alarm signal 156 (see FIG. 7), resetting the aircraft tipping alarm system 80 (see FIGS. 4, 7) to continue loading or unloading the aircraft 10 (see FIGS. 4, 7), by increasing a pressure 154 (see FIG. 7) in the elongated pressure chamber 84 (see FIG. 7) to the predetermined pressure level 148 (see FIG. 7), or more, i.e., greater than the predetermined pressure level 148 (see FIG. 7).

With the aircraft normal loading condition on the NLG assembly 20, the NLG shock strut 40 is pressurized to a predetermined pressure level 148 (see FIG. 7), where the NLG shock strut 40 is under load 178 (see FIG. 7), and in a partially extended condition providing enough of a shock absorbing function for the NLG assembly 20. This normal operation will be at a normal pressure (Pn) 148*a* (see FIG. 7) for the oleo fluid pressure 150*a* (see FIG. 7) in the NLG shock strut 40 (see FIGS. 4, 7). Depending on the type of aircraft 10 used, the actual load on the NLG assembly may vary, and in turn, the loading pressure may vary and will be aircraft specific.

During cargo aircraft loading, when the cargo 32 (see FIG. 1A) is evenly distributed in the aircraft 10 (see FIG. 1A), the load 178 (see FIG. 7) on the NLG assembly 20 (see FIGS. 1, 7) increases, further compressing the NLG shock strut 40 and increasing the oleo fluid pressure 150a (see FIG. 7). In this non-tipping position 36 (see FIG. 7), the spring loaded one-way valve 89 (see FIG. 7), such as in the form of first check valve 90, at the first end 86 of the elongated pressure chamber 84 prevents discharge of the oleo fluid 60a in the NLG shock strut 40 into the elongated pressure chamber 84 and a pressure measurement 147, or pressure reading, within the elongated pressure chamber 84 remains unchanged.

If the cargo 32 (see FIG. 1B) is loaded in the aircraft 10 (see FIG. 1B) unevenly more toward the aft or tail end of the aircraft 10 (see FIG. 1B), then the main landing gear assemblies 22 (see FIG. 1A) act like a pivot point and the load 178 (see FIG. 7) on the NLG assembly 20 (see FIG. 7) is reduced, thus reducing the oleo fluid pressure 150a (see FIG. 7) in the NLG shock strut 40. Since at this point, the oleo fluid pressure 150a (see FIG. 7) within the NLG shock strut 40 is less than the original charging pressure, which is the same as the pressure 154 (see FIG. 7) in the elongated pressure chamber 84, the pressure 154 (see FIG. 7) in the elongated pressure chamber 84 overcomes the spring loaded one-way valve 89, such as the first check valve 90, positioned at the first end 86 of the elongated pressure chamber 84, and discharges some of the pressurized oleo fluid 60a (see FIG. 7) or dry nitrogen gas 64a (see FIG. 7) within the elongated pressure chamber 84 into the NLG shock strut 40, until the pressure 154 in the elongated pressure chamber 84 is reduced, thus matching the under loaded pressure 152 (see FIG. 7) of the NLG shock strut 40 (see FIG. 7).

As the uneven loading of the cargo 30 (see FIG. 1A) towards the aft or tail end of the aircraft 10 (see FIG. 1A), continues the load 178 (see FIG. 7) on the NLG assembly 20 (see FIG. 7) of the aircraft 10 (see FIGS. 1A, 7) is further reduced, causing further reduction of oleo fluid pressure 150a (see FIG. 7) in the NLG shock strut 40 (see FIG. 7), causing discharge of the oleo fluid 60a and the gas 64 from the elongated pressure chamber 84 into the NLG shock strut 40. The pressure sensor device 98 coupled to the elongated pressure chamber 84 senses the pressure 154 in the elongated pressure chamber 84 on a real time basis during the loading of the cargo aircraft 10a (see FIG. 1A).

At a pressure of fifty percent (50%) of the predetermined pressure level 148 (see FIG. 7), such as the oleo fluid pressure 150a (see FIG. 7) in the NLG shock strut 40, where the load 178 (see FIG. 7) on the NLG assembly 20 (see FIG. 4) is within a range that the aircraft 10 (see FIG. 4) would be prone to tipping, the pressure sensor device 98 (see FIG. 4) coupled to the elongated pressure chamber 84 (see FIG. 4) generates and transmits the aircraft tipping alarm signal 156 (see FIG. 7). This produces or triggers the aircraft tipping alarm 158 (see FIG. 7) and informs the cargo loading operators 160a (see FIG. 7) of the potential aircraft tipping back position 144 (see FIG. 7) or imminent aircraft tipping back position.

The aircraft landing gear system is a critical system, and loss of oleo fluid 60a (see FIGS. 4, 5A) from the NLG shock strut 40 (see FIGS. 4, 5A) may lead to absence of the shock absorption function of the NLG assembly 20 (see FIG. 4) during landing of the aircraft 10 (see FIG. 4). This may lead to an undesirable landing condition. In case, during take-off or initial flight of the aircraft 10 (see FIG. 4), the exposed elongated pressure chamber 84 is damaged or breaks off at the reduced diameter breakable neck section 94 (see FIG. 5A), the spring loaded one-way valve 89 (see FIG. 5A), such as in the form of first check valve 92 (see FIG. 5A), positioned at the first end 86 (see FIG. 5A), continues functioning to block any release of oleo fluid 60a (see FIG. 5A) from the NLG shock strut 40 (see FIG. 5A). In case of a failure of the elongated pressure chamber 84 (see FIG. 5A), the NLG shock strut 40 (see FIG. 5A) maintains its pressurized oleo condition and does not cause a critical system, such as the NLG assembly 20 (see FIG. 4), to fail due to lack of oleo fluid pressure 150a (see FIG. 7) within the NLG shock strut 40 (see FIG. 4).

Figure 9:
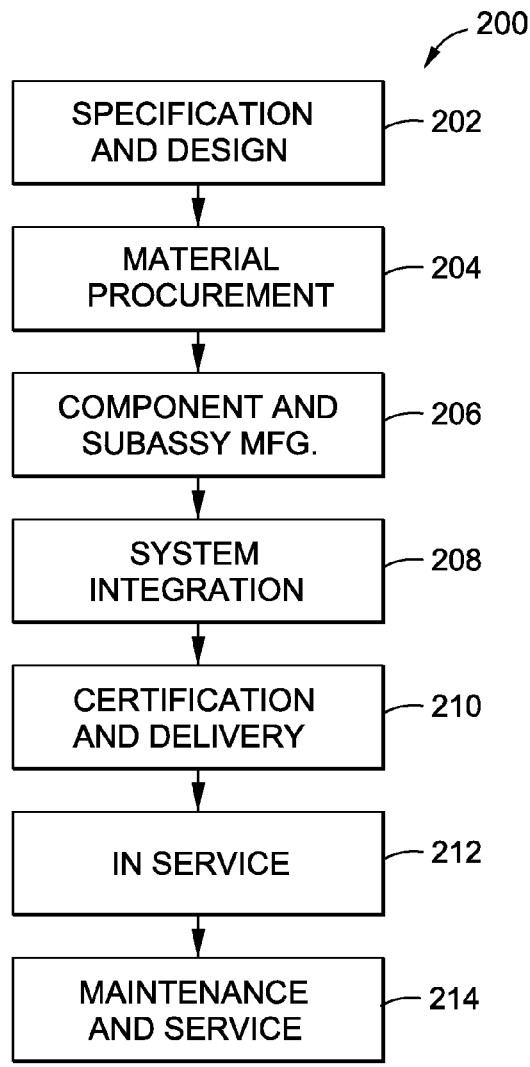
FIG. 9 is an illustration of a flow diagram of an aircraft manufacturing and service method; and, FIG. 10 is an illustration of a block diagram of an aircraft.
Figure 10:
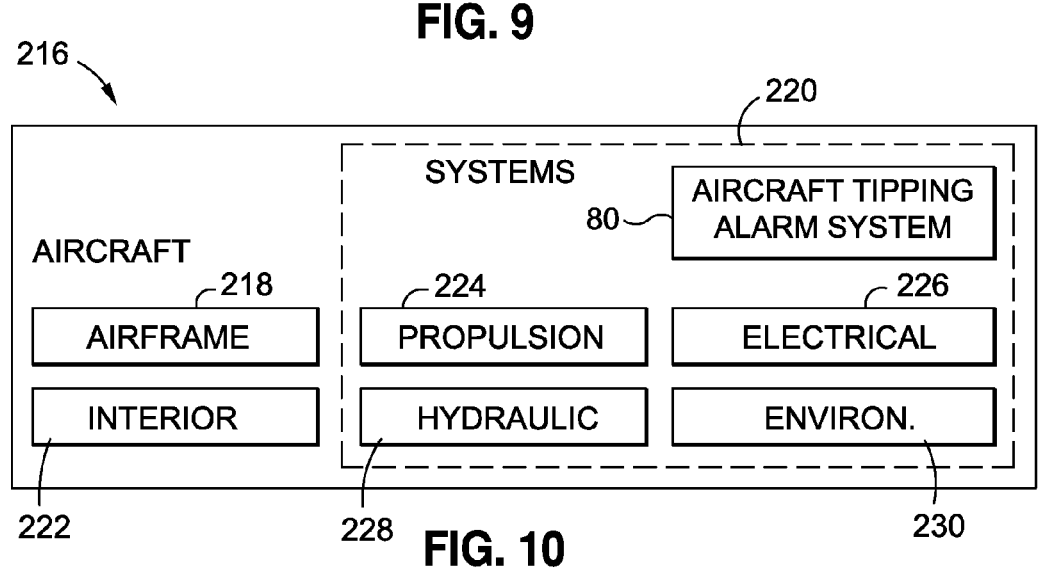

FIG. 9 is an illustration of a flow diagram of an aircraft manufacturing and service method 200. FIG. 10 is an illustration of a block diagram of an aircraft 216. Referring to FIGS. 9-10, embodiments of the disclosure may be described in the context of the aircraft manufacturing and service method 200, as shown in FIG. 9, and the aircraft 216, as shown in FIG. 10.

During pre-production, exemplary aircraft manufacturing and service method 200 may include specification and design 202 of the aircraft 216 and material procurement 204. During manufacturing, component and subassembly manufacturing 206 and system integration 208 of the aircraft 216 takes place. Thereafter, the aircraft 216 may go through certification and delivery 210 in order to be placed in service 212. While in service 212 by a customer, the aircraft 216 may be scheduled for routine maintenance and service 214 (which may also include modification, reconfiguration, refurbishment, and other suitable services).

Each of the processes of exemplary aircraft manufacturing and service method 200 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and supplier. An operator may include, without limitation, an airline, leasing company, military entity, service organization, and other suitable operators.

As shown in FIG. 10, the aircraft 216 produced by exemplary aircraft manufacturing and service exemplary method 200 may include an airframe 218 with a plurality of systems 220 and an interior 222. Examples of the plurality of systems 220 may include one or more of an aircraft tipping alarm system 80, a propulsion system 224, an electrical system 226, a hydraulic system 228, and an environmental system 230. Any number of other systems may be included. Although an aerospace example is shown, the principles of the disclosure may be applied to other industries, such as the automotive industry, the trucking industry, the watercraft industry such as for ships and submarines, the warehouse industry, and other suitable industries.

Methods and systems embodied herein may be employed during any one or more of the stages of the exemplary aircraft manufacturing and service method 200. For example, components or subassemblies corresponding to component and subassembly manufacturing 206 may be fabricated or manufactured in a manner similar to components or subassemblies produced while the aircraft 216 is in service 212. Also, one or more apparatus embodiments, method embodiments, or a combination thereof, may be utilized during component and subassembly manufacturing 206 and system integration 208, for example, by substantially expediting assembly of or reducing the cost of the aircraft 216. Similarly, one or more of apparatus embodiments, method embodiments, or a combination thereof, may be utilized while the aircraft 216 is in service 212, for example and without limitation, to maintenance and service 214.

Disclosed embodiments of the aircraft tipping alarm system 80 (see FIGS. 4-7) and the method 180 (see FIG. 8) for preventing and/or alarming against the tipping back of an aircraft 10 (see FIG. 4) during the loading or unloading of the aircraft 10 (see FIG. 4) on the ground 24 (see FIG. 4) provide an aircraft tipping alarm signal 156 (see FIG. 7) and aircraft tipping alarm 158 (see FIG. 7) on the aircraft 10 (see FIG. 4), such as a cargo aircraft 10a (see FIG. 4), that may be in danger of being overloaded or unevenly loaded with cargo 32 (see FIGS. 1A, 7) at the aft or tail end of the aircraft 10 (see FIGS. 1A, 4), resulting in an imbalance condition. The aircraft tipping alarm system 80 (see FIGS. 4-7) and the method 180 (see FIG. 8) measure or sense the reduction of oleo fluid pressure 150a (see FIG. 7) in the NLG shock strut 40 (see FIGS. 4-7) of the aircraft 10 (see FIGS. 4, 7) and provide the aircraft tipping alarm signal 156 (see FIG. 7) and aircraft tipping alarm 158 (see FIG. 7).

When the reduction of pressure 146 (see FIG. 7) of the hydraulic fluid 60 (see FIGS. 4-7), such as the oleo fluid 60a (see FIGS. 4-7), in the NLG shock strut 40 (see FIGS. 4-6B), sensed via the pressure sensor device 98 (see FIGS. 4-6B), is greater than or equal to fifty percent (50%) of the predetermined pressure level 148 (see FIG. 7), indicating a potential aircraft tipping back position 144 (see FIG. 7), the aircraft tipping alarm signal 156 (see FIG. 7) is generated and transmitted. The aircraft tipping alarm system 80 (see FIGS. 4-7) and the method 180 (see FIG. 8) signal when the oleo fluid pressure 150a (see FIG. 7) approaches a low threshold indicating the potential aircraft tipping back position 144 (see FIG. 7), resulting in extension of the NLG assembly 20 (see FIG. 4), due to excessive loading or cargo 32 (see FIGS. 1A, 7) at the aft or tail end of the aircraft 10 (see FIG. 1A).

Further, disclosed embodiments of the aircraft tipping alarm system 80 (see FIGS. 4-7) and the method 180 (see FIG. 8) provide an elongated pressure chamber assembly 50 (see FIGS. 4-7), that in one version, has two spring loaded one-way valves 89 (see FIGS. 5A-5B), such as in the form of first check valve 90 (see FIGS. 5A-5B) at the first end 86 (see FIGS. 5A-5B) of the elongated pressure chamber 84 (see FIGS. 5A-5B), and in the form of second check valve 92 (see FIGS. 5A-5B) at the second end 88 (see FIGS. 5A-5B) of the elongated pressure chamber 84 (see FIGS. 5A-5B). The aircraft tipping alarm system 80 (see FIGS. 4-7) and the method 180 (see FIG. 8) measure or sense the reduction of oleo fluid pressure 150a (see FIG. 7) in the NLG shock strut 40 (see FIGS. 4-7) of the aircraft 10 (see FIGS. 4, 7) via the elongated pressure chamber 84 (see FIGS. 4-7), which isolates the NLG shock strut 40 (see FIG. 4) in case of structural damage to the elongated pressure chamber 84 (see FIG. 4). Preferably, the first check valve 90 (see FIGS. 5A-5B) is embedded within the NLG shock strut 40 (see FIGS. 5A-5B), thus further isolating the NLG shock strut 40 (see FIGS. 5A-5B), in case of structural damage to the elongated pressure chamber 84 (see FIGS. 5A-5B).

In addition, disclosed embodiments of the aircraft tipping alarm system 80 (see FIGS. 4-7) and the method 180 (see FIG. 8) provide an elongated pressure chamber assembly 50 (see FIGS. 4-7) having a reduced diameter breakable neck section 94 (see FIGS. 5A-5B) (e.g., mechanical fuse). This is a sacrificial section for breaking off the elongated pressure chamber 84 (see FIGS. 5A-5B) in case of damage during take-off or an initial stage of flight, such as by an impact event 162 (see FIG. 7), for example, a bird strike 162a (see FIG. 7), or another cause of damage. Other causes of damage to the elongated pressure chamber 84 (see FIGS. 5A-5B) besides a bird strike 162a (see FIG. 7) may include towing the aircraft 10 (see FIGS. 1A, 4) or other physical contact or impact to the elongated pressure chamber 84 (see FIGS. 5A-5B) which causes the elongated pressure chamber 84 (see FIGS. 5A-5B) to break off.

The structurally advantageous reduced diameter breakable neck section 94 (see FIGS. 5A-5B) isolates the NLG shock strut 40 (see FIGS. 5A-5B) and prevents the NLG shock strut 40 (see FIGS. 5A-5B) from losing hydraulic fluid 60 (see FIGS. 5A-5B), such as oleo fluid 60a (see FIGS. 5A-5B), which is needed for providing shock absorption upon landing of the aircraft 10 (see FIG. 1A). In addition, this leaves the hydraulic fluid pressure 150 (see FIG. 7), such as the oleo fluid pressure 150a (see FIG. 7), in the NLG shock strut 40 (see FIGS. 5A-5B) unaffected. Thus, the aircraft tipping alarm system 80 (see FIGS. 4-7) disclosed herein does not affect the NLG assembly 20 (see FIG. 4), which is a critical system in the aircraft 10 (see FIG. 1A), and does not affect the hydraulic fluid pressure 150 (see FIG. 7) in the NLG shock strut 40 (see FIG. 4).

Moreover, disclosed embodiments of the aircraft tipping alarm system 80 (see FIGS. 4-7) and the method 180 (see FIG. 8) provide a simple, safe, reliable, resettable and repeatable aircraft tipping alarm system 80 (see FIGS. 4-7) and method 180 (see FIG. 8) that does not involve structural and mechanical moving systems, and that effectively warn against imminent tipping of the aircraft 10 (see FIG. 1A), such as the cargo aircraft 10a (see FIG. 1A), due to uneven or excessive loading of cargo 32 (see FIG. 1A) at the aft or tail end of the aircraft 10 (see FIG. 1A). In addition, the disclosed embodiments of the aircraft tipping alarm system 80 (see FIGS. 4-7) may be incorporated into new aircraft or retrofitted into existing aircraft.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An aircraft tipping alarm system for an aircraft, the aircraft tipping alarm system comprising:
   a nose landing gear (NLG) shock strut containing hydraulic fluid and having an aperture; and,
   an elongated pressure chamber assembly coupled to the NLG shock strut, the elongated pressure chamber assembly comprising:
   an elongated pressure chamber containing hydraulic fluid and having a pressure sensor device;
   a first check valve positioned at a first end of the elongated pressure chamber, the first check valve restricting hydraulic fluid flow only into the NLG shock strut;
   a second check valve positioned at a second end of the elongated pressure chamber, the second check valve restricting hydraulic fluid flow only into the elongated pressure chamber; and,
   a reduced diameter breakable neck section, wherein a potential aircraft tipping back position is indicated when a reduction of pressure of the hydraulic fluid in the NLG shock strut, sensed via the pressure sensor device, is greater than or equal to a pressure reduction threshold.

2. The system of claim 1, wherein the aircraft is a cargo aircraft.

3. The system of claim 1, wherein the NLG shock strut is a nose landing gear (NLG) oleo pneumatic shock strut, and the hydraulic fluid is oleo fluid.

4. The system of claim 1, wherein when the potential aircraft tipping back position is indicated, the pressure sensor device generates and transmits an aircraft tipping alarm signal to produce an aircraft tipping alarm that is sensible to a human being.

5. The system of claim 1, wherein the pressure sensor device comprises a mechanical gauge pressure sensor or a piezoelectric pressure sensor.

6. The system of claim 1, wherein the first check valve is embedded within the NLG shock strut.

7. The system of claim 1, wherein the first check valve is replaced with an open end portion configured to couple with a nose landing gear (NLG) check valve on the NLG shock strut, the NLG check valve being configured to restrict hydraulic fluid flow only into the NLG shock strut.

8. The system of claim 1, wherein the second check valve includes an externally threaded open end portion configured for coupling to a fluid pump and supply assembly.

9. The system of claim 1, wherein the reduced diameter breakable neck section is configured to break away from the NLG shock strut upon impact, and wherein upon breakage of the reduced diameter breakable neck section, only the first check valve remains engaged to the aperture.

10. The system of claim 1, wherein the reduction of pressure of the hydraulic fluid in the NLG shock strut for indicating the potential aircraft tipping back position is adjustable upward or downward.

11. The system of claim 1, wherein the aircraft tipping alarm system further comprises an alarm control system comprising one or more of a controller, a power source, an aircraft tipping alarm apparatus, one or more display units, a system logic, and a cargo handling system deactivator device.

12. The system of claim 1, wherein the potential aircraft tipping back position is indicated when the reduction of pressure of the hydraulic fluid in the NLG shock strut, sensed via the pressure sensor device, is greater than or equal to fifty percent (50%) of a predetermined pressure level of the hydraulic fluid in the NLG shock strut.

13. A cargo aircraft comprising:
a nose landing gear (NLG) assembly coupled to a fuselage; and,
an aircraft tipping alarm system coupled to the nose landing gear (NLG) assembly, the aircraft tipping alarm system comprising:
a nose landing gear (NLG) shock strut containing oleo fluid and having an aperture; and,
an elongated pressure chamber assembly configured to engage to the aperture, the elongated pressure chamber assembly comprising:
an elongated pressure chamber containing oleo fluid and having a pressure sensor device;
a first check valve configured to restrict oleo fluid flow only into the NLG shock strut;
a second check valve configured to restrict oleo fluid flow only into the elongated pressure chamber, the second check valve having an externally threaded open end portion configured for coupling to a fluid pump and supply assembly; and,
a reduced diameter breakable neck section configured to break away from the NLG shock strut upon impact, and wherein upon breakage of the reduced diameter breakable neck section, only the first check valve remains engaged to the aperture,
wherein a potential aircraft tipping back position is indicated when a reduction of pressure of the oleo fluid in the NLG shock strut, sensed via the pressure sensor device, is greater than or equal to fifty percent (50%) of a predetermined pressure level of the oleo fluid in the NLG shock strut.

14. The cargo aircraft of claim 13, wherein the first check valve is embedded within the NLG shock strut.

15. The cargo aircraft of claim 13, wherein the first check valve is replaced with an open end portion configured to couple with a nose landing gear (NLG) check valve on the NLG shock strut, the NLG check valve being configured to restrict oleo fluid flow only into the NLG shock strut.

16. The cargo aircraft of claim 13, wherein the aircraft tipping alarm system further comprises an alarm control system comprising one or more of a controller, a power source, an aircraft tipping alarm apparatus, one or more display units, a system logic, and a cargo handling system deactivator device.

17. The cargo aircraft of claim 13, wherein when the potential aircraft tipping back position is indicated, the pressure sensor device generates and transmits an aircraft tipping alarm signal to produce an aircraft tipping alarm that is sensible to a human being.

18. A method for preventing or alarming against a tipping back position of an aircraft during a loading or unloading of the aircraft on ground, the method comprising the steps of:
equipping the aircraft with an aircraft tipping alarm system, the aircraft tipping alarm system comprising an elongated pressure chamber assembly coupled to a nose landing gear (NLG) shock strut via a first check valve, the elongated pressure chamber assembly comprising a pressure sensor device and a reduced diameter breakable neck section;
determining a predetermined pressure level of a hydraulic fluid in the NLG shock strut;
activating the aircraft tipping alarm system, during the loading or unloading of the aircraft;
measuring a reduction of pressure of the hydraulic fluid in the NLG shock strut via the pressure sensor device coupled to an elongated pressure chamber, which is coupled to the NLG shock strut, during the loading or unloading of the aircraft; and,
generating and transmitting with the pressure sensor device an aircraft tipping alarm signal, when the reduction of pressure of the hydraulic fluid in the NLG shock strut, sensed via the pressure sensor device, is greater than or equal to fifty percent (50%) of the predetermined pressure level, indicating a potential aircraft tipping back position.

19. The method of claim 18, further comprising a step of producing an aircraft tipping alarm that is sensible by a human being, upon the generating and transmitting of the aircraft tipping alarm signal.

20. The method of claim 18, further comprising a step of partially or fully deactivating a cargo handling system engaged in the loading or unloading of the aircraft, upon the generating of the aircraft tipping alarm signal.

21. The method of claim 18, wherein the step of equipping the aircraft further comprising equipping a cargo aircraft with the aircraft tipping alarm system, and further comprising a step of embedding the first check valve of the aircraft tipping alarm system within the NLG shock strut, where the first check valve is part of the elongated pressure chamber.

22. The method of claim 21, wherein the step of equipping the aircraft further comprising a step of replacing the first check valve of the elongated pressure chamber assembly with an open end portion configured to couple with a nose landing gear (NLG) check valve on the NLG shock strut, the NLG check valve being configured to restrict hydraulic fluid flow only into the NLG shock strut.

23. The method of claim 18, further comprising a step of once the aircraft tipping alarm system is activated and generates and transmits the aircraft tipping alarm signal, resetting the aircraft tipping alarm system to continue loading or unloading the aircraft by increasing a pressure in the elongated pressure chamber to the predetermined pressure level.

* * * * *